United States Patent
Hudgeons et al.

(10) Patent No.: US 7,650,623 B2
(45) Date of Patent: Jan. 19, 2010

(54) METHOD AND SYSTEM FOR FACILITATING INTERACTIVE MULTIMEDIA EXPERIENCES

(75) Inventors: Brandon Lee Hudgeons, Austin, TX (US); Hoyt Lindley, Austin, TX (US)

(73) Assignee: Internal Machine Industries, Inc., Austin, TX (US)

( * ) Notice: Subject to any disclaimer, the term of this patent is extended or adjusted under 35 U.S.C. 154(b) by 1520 days.

(21) Appl. No.: 10/716,173

(22) Filed: Nov. 18, 2003

(65) Prior Publication Data

US 2004/0210923 A1 Oct. 21, 2004

Related U.S. Application Data

(60) Provisional application No. 60/427,100, filed on Nov. 18, 2002, provisional application No. 60/427,101, filed on Nov. 18, 2002.

(51) Int. Cl.
*H04N 60/33* (2006.01)
*H04N 7/173* (2006.01)

(52) U.S. Cl. .................. 725/136; 725/13; 725/105; 725/109; 725/121

(58) Field of Classification Search ............. 725/13, 725/105, 109, 121, 136
See application file for complete search history.

(56) References Cited

U.S. PATENT DOCUMENTS

| | | | |
|---|---|---|---|
| 4,357,014 A | 11/1982 | Baer et al. | |
| 4,591,248 A | 5/1986 | Freeman | |
| 4,777,488 A | 10/1988 | Carlman, Jr. et al. | |
| 5,111,409 A | 5/1992 | Gasper et al. | |
| 5,226,177 A | 7/1993 | Nickerson | |
| 5,273,437 A | 12/1993 | Caldwell et al. | |
| 5,365,266 A | 11/1994 | Carpenter | |
| 5,453,015 A | 9/1995 | Vogel | |
| 5,465,384 A | 11/1995 | Bejan et al. | |
| 5,737,527 A | 4/1998 | Shiels et al. | |
| 5,751,953 A | 5/1998 | Shiels et al. | |
| 5,771,167 A | 6/1998 | Gomi et al. | |
| 5,795,228 A | 8/1998 | Trumbull et al. | |
| 5,801,754 A | 9/1998 | Ruybal et al. | |
| 5,828,294 A | 10/1998 | Shank | |
| 5,835,715 A | 11/1998 | Dahl | |
| 5,912,743 A | 6/1999 | Kinebuchi et al. | |
| 6,056,640 A | 5/2000 | Schaaij | |
| 6,208,976 B1 | 3/2001 | Kinebuchi et al. | |
| 6,222,925 B1 | 4/2001 | Shiels et al. | |
| 6,257,982 B1 | 7/2001 | Rider et al. | |
| 6,309,301 B1 | 10/2001 | Sano | |

(Continued)

OTHER PUBLICATIONS

XMLPitstop.com; http://www.xmlpitstop.com; <xselerator>; 14 pages.

*Primary Examiner*—Hunter B. Lonsberry
(74) *Attorney, Agent, or Firm*—Raymond M. Galasso; Galasso & Associates, L.P.

(57) ABSTRACT

A method configured for facilitating an interactive multimedia experiences comprising accessing a system-readable specification defining a multimedia experience configured for audience interaction and performing the multimedia experience in accordance with information comprised by the system-readable specification. The information comprised by the system-readable specification includes information for enabling facilitation of audience response tracking, experience navigation and feedback of audience responses. Performing the multimedia experience includes gathering audience responses, analyzing the audience responses, outputting information resulting from the analyzing audience responses and outputting experience content.

83 Claims, 10 Drawing Sheets

U.S. PATENT DOCUMENTS

| | | |
|---|---|---|
| 6,346,045 B2 | 2/2002 | Rider et al. |
| 6,356,939 B1 | 3/2002 | Dahl |
| 6,366,196 B1 | 4/2002 | Green et al. |
| 2002/0133827 A1* | 9/2002 | Newnam et al. .............. 725/89 |

* cited by examiner

FIG. 1

```xml
<?xml version="1.0"?>
<AIML>
<MOVIE url="/cinematics/introMovie.mov" height="720"
    width="1080" format="QuickTime"/>
<QUESTION
    questionAudio=" /audio/Adv01_Qu.wav"
    url="/flash/questionAnimation.swf" timer="10">
  <QUESTIONTEXT>The Mummy Returns featured professional
      wrestler The Rock. What is his real name?</QUESTIONTEXT>
  <ANSWER correct="true">Dwayne Johnson</ANSWER>
  <ANSWER>Jerome Jackson</ANSWER>
  <ANSWER>Dennis Jameson</ANSWER>
  <ANSWER>Drew Jefferson</ANSWER>
</QUESTION>
<QUESTION
    questionAudio="/audio/Adv02_Qu.wav"
    url="/flash/questionAnimation.swf" timer="10">
  <QUESTIONTEXT>In the adventure film Raiders of the Lost Ark,
      how did the little Nazi monkey die?</QUESTIONTEXT>
  <ANSWER>Gun Shot</ANSWER>
  <ANSWER>Explosion in Truck</ANSWER>
  <ANSWER correct="true">Bad Dates</ANSWER>
  <ANSWER>Lightning</ANSWER>
</QUESTION>
<MOVIE url="/cinematics/exitMovie.mov" height="720"
    width="1080" format="QuickTime"/>
</AIML>
```

Labels: 150, 152, 154, 158, 160

METHOD AND SYSTEM FOR FACILITATING INTERACTIVE MULTIMEDIA EXPERIENCES

CROSS REFERENCE TO RELATED APPLICATIONS

This application claims priority to U.S. Provisional Patent Application having Ser. No. 60/427,101 filed Nov. 18, 2002 entitled "Implementation of an Interactive Theater Entertainment and Ordering System" and U.S. Provisional Patent Application having Ser. No. 60/427,100 filed Nov. 18, 2002 entitled "A Unique Network Architecture And Distributed Algorithm For Efficient Data Collection Over A Fixed Network", both applications having common applicants herewith.

FIELD OF THE DISCLOSURE

The disclosures made herein relate generally to multimedia entertainment methods and systems and, more particularly, to methods and systems for facilitating interactive multimedia experiences.

BACKGROUND

An interactive multimedia system comprises a combination of hardware and software in a manner that enables interactive multimedia experiences. Minimal elements of an integrated interactive multimedia system are a display capable of showing multimedia assets (such as video, animation, images and sound), one or more input devices that allow interaction between users and the interactive multimedia system, and an Application Programmer's Interface (API) that allows interactive multimedia designers to design interactive experiences, such as games, business presentations, educational presentations, etc. Some interactive multimedia systems also include one or more additional elements for supporting the capability of installation-to-installation communication (e.g., between two or more auditoriums), thereby allowing distributed multimedia experience participation (e.g., distributed gaming). Furthermore, some interactive multimedia systems have the ability to enhance point-of-sale (POS) operations by facilitating product orders.

Three examples of interactive multimedia systems are personal computer systems, personal gaming consoles and audience response systems. Personal computer systems typically have a single display designed for one viewer and support only the interactive input of a single user. Several multimedia APIs exist for personal computer systems. Personal gaming consoles such as Microsoft Corporation's Xbox® and Sony Computer Entertainment's Playstation® typically have a single television-sized display, support simultaneous interactive inputs from up to four users, and support a single proprietary multimedia API. Audience response systems have large, often projected displays, support the interactive input of multiple users. These systems consist of installation of a hardware solution such as Fleetwood Incorporated's Reply® system in combination with certain software packages (e.g., Advanced Software Products' Digital Professor™ application) that are designed to allow rudimentary presentations or application programs such as Buzztime Entertainment Incorporated's Buzztime™ application. Because no multimedia API existed for these applications at the time of their development, the designers of these applications have had to work directly with the underlying input device APIs in order to create multimedia applications for group environments.

Designers who create multimedia experiences for a personal computer system or for a personal gaming console do so using various multimedia system APIs and tools that have become very refined, powerful and widely used, but all were designed to accept interactive responses from one or, at most, a few simultaneous users. In contrast, APIs and tools for shared-experience multimedia, such as audience response systems, must specifically address simultaneous interaction from a large group of participants at a single location (e.g., an auditorium). Because the use of shared-experience interactivity has been limited to relatively large-budget productions or single-purpose installations, there has been limited awareness of the need for a flexible multimedia API for shared-experience interactivity. As a result, a technology gap exists between the magnitude of powerful, easy-to-use, common standards and tools designed for individual-experience multimedia and the expensive, complicated and often poor quality tools and technologies available for shared-experience multimedia.

An experience designer could use existing, well-supported individual-experience multimedia tools (e.g., Macromedia's Flash technology) to design a multimedia presentation and show it on a movie screen before a large audience. However, no mechanism exists for allowing an audience to participate in the presentation interactively. Even if members of the audience were equipped with some means of interacting with the presentation (such as wireless handheld devices), significant limitations exist with respect to showing the immediate results of that interaction on the screen.

Various configurations of personal computer systems, personal gaming consoles and audience response systems are embodiments of conventional interactive multimedia systems. It is known that conventional interactive multimedia systems exhibit one or more limitations with respect to their capability and/or functionality. Examples of such limitations include the limited number of users able to participate in multimedia experiences, the speed with which a large number of audience inputs can be integrated with on-screen multimedia, the difficulty of developing the multimedia experience, the difficulty associated with using existing, well-supported and well-understood design tools, the limited ability to integrate multimedia assets created for other environments, the level of distributed multimedia experience participation offered and the level of POS functionality offered.

Therefore, methods and equipment adapted for facilitating interactive multimedia functionality in a manner that overcomes limitations associated with conventional approaches for facilitating interactive multimedia functionality would be novel and useful.

BRIEF DESCRIPTION OF THE DRAWING FIGURES

FIG. 1 depicts an XML-based file for specifying the operation of a group interactive experience in accordance with an embodiment of the disclosures made herein.

DETAILED DESCRIPTION OF THE DRAWING FIGURES

Figure 2:
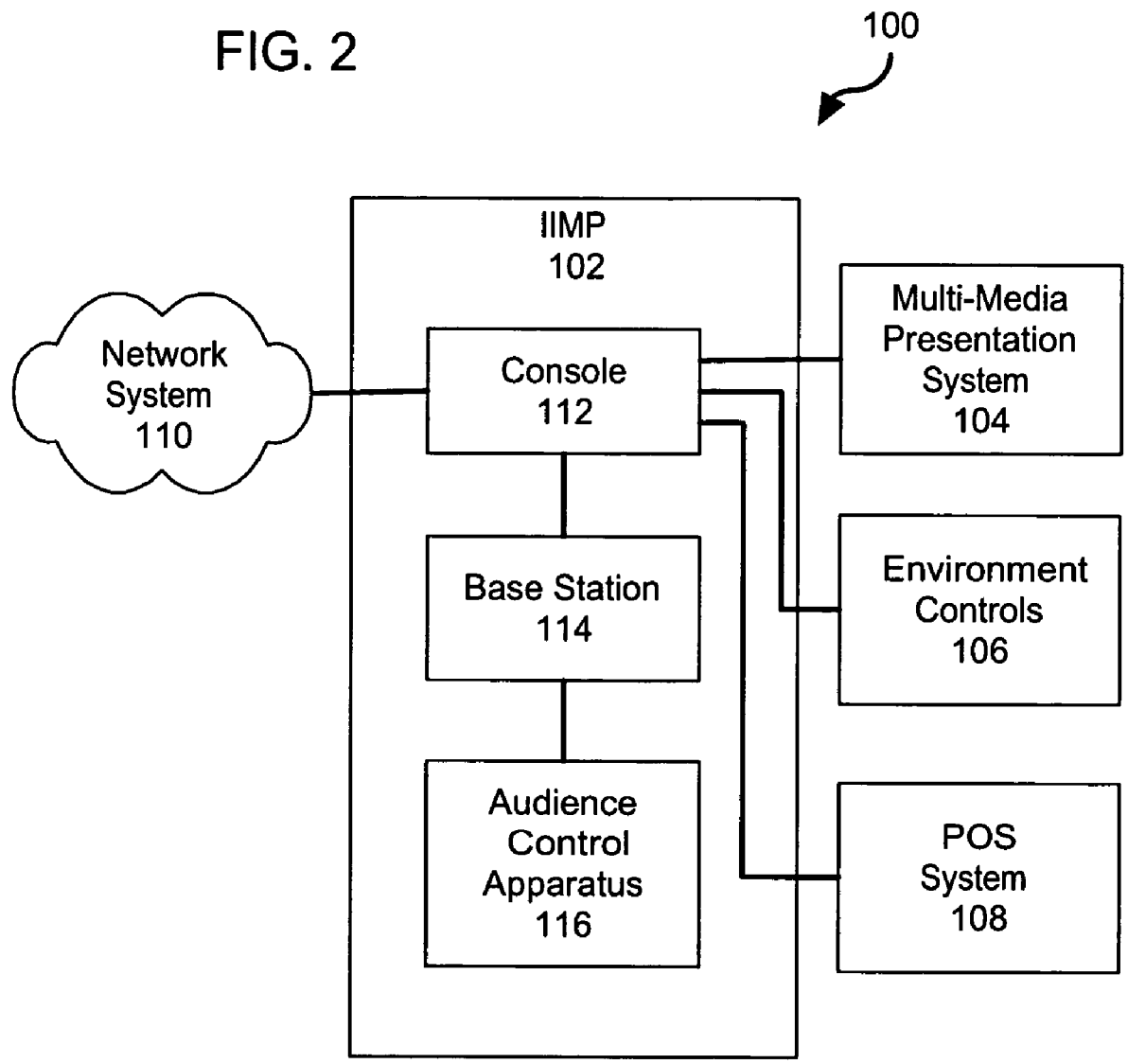
FIG. 2 depicts an interactive multimedia apparatus (IMA) capable of carrying out interactive multimedia functionality in accordance with embodiments of the disclosures made herein.

The disclosures made herein relate to an integrated interactive multimedia platform. An integrated interactive multimedia platform is defined herein to mean an interactive multimedia solution that comprises an integrated combination of functionality that enables interactive experiences to be created and facilitated. Examples of such functionality include large venue presentation functionality, audience interaction information acquisition functionality, Point-Of-Sale (POS) functionality and distributed interactive experience functionality via inter-installation communication (i.e., communication between multiple interactive multimedia installations). Methods and/or equipment capable of carrying out functionality in accordance with embodiments of the disclosures made herein enable custom-configured, media-rich interactive experiences to be created and facilitated in a useful and advantageous manner with respect to conventional interactive multimedia systems.

Methods and systems in accordance with embodiments of the disclosures made herein (i.e., disclosed methods and systems) overcome limitations of conventional interactive multimedia systems (i.e., conventional multimedia system API approaches) with respect to their abilities for allowing designers to create interactive multimedia experiences. Such disclosed methods and systems allow experience designers to create group interactive experiences using the same types of skills and tools often used to create other multimedia assets such as multimedia web pages. By creating a high-level experience definition API, a designer's creativity and productivity are enhanced by allowing them to use tools and methods familiar to them. In addition, designers can use and re-purpose multimedia assets created for individual-experience multimedia, greatly reducing the cost of creating associated shared-experience multimedia presentations.

In accordance with one embodiment of the disclosures made herein, a method configured for facilitating an interactive multimedia experiences comprises accessing a system-readable specification defining a multimedia experience configured for audience interaction and performing the multimedia experience in accordance with information comprised by the system-readable specification. The information comprised by the system-readable specification includes information for enabling facilitation of audience response tracking, experience navigation and real-time feedback of audience responses. Performing the multimedia experience includes gathering audience responses, analyzing the audience responses, outputting information resulting from this analysis in a real-time manner and outputting experience content. (In this document, the description "real-time" when used to describe analysis or display means that audience interactions are processed immediately, prior to receipt and/or confirmation of all inputs, and that any display or other feedback or results of those interactions can be displayed in a manner that appears instantaneous to the audience.)

Experience feedback information is information about the state of an interactive multimedia experience, including progression of the experience, the state of any multimedia files contained in the multimedia experience, and records and analyses of audience responses. In accordance with another embodiment of the disclosures made herein, a method configured for facilitating an interactive multimedia experience comprises accessing a system-readable specification defining a multimedia experience configured for audience interaction, maintaining real-time updates of experience feedback information and performing said multimedia experience dependent upon at least one of information comprised by the system-readable specification and said experience feedback information. The system-readable specification includes a plurality of display elements. Performing the multimedia experience includes accessing a multimedia asset associated with one of the display elements, and access information for the multimedia asset is specified within the system-readable specification. In one embodiment, the feedback information includes information resulting from analysis of at least one of amplitude characteristics of a sound file and length characteristics of the sound file, and performing the multimedia experience includes synchronizing a video component comprised by the multimedia experience with a corresponding audio component comprised by the multimedia experience dependent upon said information resulting from analysis of the sound file.

A feedback information action is a software action (such as setting the value of a variable, generating a software event, or executing or calling a software procedure or method) generated in response to experience feedback information. In accordance with one embodiment of the disclosures made herein, a method configured for facilitating an interactive multimedia experiences comprises creating a system-readable specification defining a multimedia experience configured for audience interaction, designating a feedback information action for enabling corresponding feedback information to be updated accordingly in response to performing the multimedia experience; and associating the feedback information action with the system-readable specification whereby performing the multimedia experience is dependent upon said corresponding feedback information. Creating the system-readable specification is performed dependent upon system-specified rules configured for enabling the specification to be interpreted and performed by said system. Performing the multimedia experience includes accessing a multimedia asset associated with one of said display elements, wherein the access information for the multimedia asset is specified within the system-readable specification. Creating the system-readable specification includes specifying a manner in which audience responses are gathered, specifying a manner in which the audience responses are analyzed; and specifying the manner in which information resulting from analyzing the audience responses is outputted and the manner in which such information affects the progression of the multimedia experience. Preferably, specifying the manner in which the information resulting from analyzing the audience responses is outputted includes specifying a manner in which at least a portion of the information resulting from analyzing the audience responses is displayed. Furthermore, creating the system-readable specification includes specifying a manner in which performing the multimedia experience includes outputting experience content. Preferably, creating the system-readable specification includes specifying a manner in which audience response tracking, experience navigation and real-time feedback of audience responses are performed.

In accordance with one embodiment of the disclosures made herein, a method configured for creating a system-readable specification defining a multimedia experience configured for audience interaction comprises specifying a manner in which audience response tracking is performed, specifying a manner in which experience navigation is performed; and specifying a manner in which real-time feedback of audience responses is performed. Each one of the specifying operations is performed dependent upon system-specified rules configured for enabling a system-readable specification to be interpreted and performed by said system. Optionally, the method further comprises specifying a manner in which said audience responses are analyzed and specifying a manner in which information resulting from said analyzing is outputted or affects the progression of the multimedia experience.

Details of APIs, experience definition files and associated functionalities in accordance with embodiment of the disclosures made herein will now be discussed. It should be understood that disclosed methods and systems comprise unique proprietary mechanisms for enabling large audience interactivity and interfacing with venue systems.

One important aspect of such disclosed methods and systems is that they fill a technology gap between shared-experience multimedia and individual-experience multimedia. Disclosed methods and systems fill this technology gap through an API that allows an experience designer (e.g., a multimedia artist) to create very complex shared-experience multimedia presentations easily, using the same multimedia production skills, tools and technologies used to create multimedia web pages. Basically, the experience designer creates the individual sections of the multimedia experience in the same way that he or she would create a traditional multimedia web page or a traditional business presentation, except that the designer follows certain rules (discussed in detail below) to account for the audience's responses and other information provided by the gaming engine. Then, the designer specifies the flow and operation of the interactive experience by including the names and locations of those multimedia files in an experience definition instantiation (e.g., an experience definition file) in accordance with an embodiment of the disclosures made herein. In this way, the designer creates a shared-experience multimedia presentation without ever having to consider the details of how responses are gathered and processed, or about recording, restoring or otherwise maintaining persistent game data. The system reads and processes a chosen experience definition file, initializes the experience accordingly, and loads the multimedia files from the specified locations as the presentation progresses.

When creating a traditional multimedia experience, a multimedia designer typically includes mechanisms for detecting and responding to user actions and input (e.g., from a keyboard or mouse). Similarly, for an interactive multimedia as disclosed herein, a disclosed system (e.g., an interactive multimedia platform such as an Audience Interactive Markup Language, or AIML, server) supplies similar inputs that provide experience state information and audience input information. Such information is jointly referred to herein as experience feedback information. It is contemplated herein that nearly all, if not all, types of front-end display technology that can be controlled or process information in real-time can be controlled or sent information by a disclosed system in this manner.

Specifically, a disclosed system sends constant real-time updates of experience feedback information to display elements and associated multimedia displays (e.g., Flash presentations). This experience feedback information comprises information regarding the state of an interactive multimedia experience and information regarding an audience's responses to the on-screen activity of the interactive multimedia experience. An experience designer can choose to ignore all or any part of the experience feedback information. If the experience designer chooses to use any of the information, the experience designer need only accept supported events, implement supported procedures, or create one or more supported variables. The disclosed system updates these events, procedures or variables immediately upon receipt of audience responses, allowing the information to be utilized as necessary. Because all experience state information and experience interaction information is actually stored within the disclosed system, and not within a multimedia file, data persistence is managed advantageously. Examples of such variables are presented in Table 1 below.

TABLE 1

| Experience Variables | |
|---|---|
| amplitude: | Immediately prior to playing any voice-over (i.e., non-background) sound file, the system performs real-time sound file analysis on the sound file or string of concatenated sound files. It sends the resulting amplitude values to the display element and associated multimedia files via a feedback information action. Animators can, for example, use this value to create sound-synchronized animations, including matching an animated character's mouth movements to the voice-over file. The sample rate, maximum and minimum values of the amplitude analysis can be set to different values from default values via the ampFPS, ampMax and ampMin attributes of specified display elements. |
| nextAmplitude: | A disclosed system may not know what the next sound file is going to be until results of audience interaction are available. Therefore, sound file analysis cannot occur until the interaction is processed. In some cases, however, a disclosed system is able to determine sooner what the next sound file will be. In such cases, the system performs the sound file analysis as soon as possible and sends the resulting amplitude values to the display element and associated multimedia files via a feedback information action, allowing multimedia assets using information to pre-load and/or process the values to make transitions smoother and faster. |
| currentSoundLength: | Immediately prior to playing any voice-over (i.e., non-background) sound file, the system sends the length of the sound file in tenths of a second. |
| question(n) | Holds the value of a question being asked of the audience (for example, "In what year did movie X debut?") |
| answer (x-y) | Allows questions to have any number of possible answers (including zero). The answers for question X are contained in this variable. For convenience, a single-question file can also access the answers via the feedback information answer(n) (e.g., answer1, answer2, answer3). |
| answer(n) Visible | Evalutates to "true" when the sound file associated with an answer is played. This allows an experience designer to hide the answers and reveal them one-at-a-time as a narrator announces them (e.g., as a corresponding sound file is played). |

TABLE 1-continued

Experience Variables

| | |
|---|---|
| correctAnswer | Holds the correct answer to the specified question. |
| countdown | A value (e.g., a positive integer) that is passed to a display element after a question and corresponding possible answer audio file(s) are played. A displayed timer, for example, can count down the amount of time remaining based on the countdown variable. |
| questionTitle | Set to the value of a title attribute of a corresponding QUESTION display element. |
| questionNum | Set to the number of the question. The question numbers can be explicitly set by a questionNumber attribute of a corresponding QUESTION display element, or it may be assigned automatically by a disclosed system for a non-deterministic experience. |
| questionVal(n) | Gives the point value for each of a plurality of questions. |
| questionDec | Specifies the amount that the point value will be decremented each time the countdown clock ticks. |
| category | Specifies a question's category name. |
| round | Specifies a round number. |
| seatCall | Specifies a specific seat number. Chosen seats are identified by these variables, in order. |
| winningSeat | Specifies the number of a winning seat for experiences that require such information. |
| percentAnswer(x-y) | Set in real-time as answers are tabulated to the percentage of the voting audience that has given a specific answer. |
| percentCorrect(n) | Updated in real-time to reflect the percentage of the audience that has answered a given question correctly. |
| prize | Passes the value specified by the prize attribute of a QUESTION display element. attribute of a QUESTION display element. |
| message | Passes a value specified by a message attribute of a QUESTION display element. |
| seatName | Updated in real-time and specifies the top-scoring seats for an experience. |
| seatScore | Specifies the top score values, in order. Using seatScore and seatName, a scoreboard can be displayed. |
| indSeatName/indSeatScore | Updated with the seat and score of any of the seats identified by seatCall. |
| hand, id | Updated every time a user submits a valid response. In the first action, "response" is set to a responsetype value. In the second action, "responseid" is the seat number or other identifying string of the user that submitted the response. Using these two variables, the game can show real-time responses to individual user inputs. |

In one embodiment of interactive multimedia experiences, a disclosed system uses a Flash ActionScript global function fscommand( ) to receive notifications of specific events from the interactive system. In another embodiment of interactive multimedia experiences, a disclosed system specifies Flash ActionScript functions to receive notifications of specific events from the interactive system. In yet another embodiment of interactive multimedia experiences, scripted functions within a PowerPoint presentation or an HTML page allow such elements to receive notifications of specific events from the interactive system. In each of these examples, the setting of variables, execution of functions and generation of events in response to experience feedback information are examples of feedback information actions as herein defined.

Turning now to a discussion of file formats executable by disclosed systems, a system-readable specification is an information structure that defines a multimedia experience configured for audience interaction (e.g., an interactive multimedia experience). Specifically, a system-readable specification is an information structure that can be interpreted and performed by a disclosed system. The system-readable specification specifies the flow of a corresponding interactive multimedia experience and how presentation elements of the specification will be performed by disclosed systems. In one embodiment, the system-readable specification adheres to an XML document format, and is specifically referred to herein as an Audience Interactive Mark-up Language (AIML) file. An AIML file (e.g., having an .aiml file extension) comprises mark-up language tags and corresponding functionalities associated therewith.

Referring to an AIML file 150 depicted in FIG. 1, the interactive multimedia experience comprises five multimedia assets (i.e., two QuickTime movies (introMovie.mov and exitMovie.mov), one Flash animation file (questionAnimation.swf), and two sound files (Adv01_Qu.wav and Adv02_Qu.wav)). These multimedia assets were created using various conventional (e.g., off-the-shelf) tools.

When loaded and executed by a disclosed system, the interactive multimedia experience depicted in FIG. 1 will present the various display elements in sequence. Specifically, the disclosed system will execute the introMovie.mov QuickTime movie, followed by presenting a first question in conjunction with executing the questionAnimation.swf Flash file and first sound file, followed by presenting a second question in conjunction with presenting the questionAnimation.swf Flash file and second sound file, followed by presenting the exitMovie.mov QuickTime movie.

It should be noted that the experience designer can use the same Flash file for both questions. This is because the designer has used feedback information actions discussed above to allow the disclosed system to specify the corresponding text of the questions. Thus, in order to add a new question to the game, the experience designer only needs to record a new sound file for the new question and add the appropriate question to the AIML file.

In this simple example, the experience designer chose not to specify many of the options available for the AIML file, so the default values apply. Accordingly, the disclosed system will (according to system-defined default values) handle all aspects of gathering and processing input from the audience, as well as all persistent game information (current scores, etc). All audience responses will also be logged for later analysis.

The schema tags (also referred to herein as audience interaction mark-up language tags) of an AIML file (e.g., MOVIE, QUESTION, QUESTIONTEXT and ANSWER schema tags in FIG. 1) identify the display elements of the interactive multimedia experience. Display elements are the major components of an interactive multimedia experience in accordance with the disclosures made herein. Each display element can have attributes associated wherewith. For example, the QUESTION display elements in FIG. 1 have attributes questionAudio, url and timer. Such attributes specify the location of multimedia files and other options and settings related to the display element. If not specified, attributes generally have a default value that will apply to the corresponding display element.

The experience definition file 150 is comprised of a plurality of experience segments 152 (e.g., a plurality of discrete display elements). Each one of the experience segments 152 are comprised of a plurality of experience segment components including information defining segment context/sequence (e.g., audience interactive mark-up language tags 154), experience content (e.g., multimedia assets 158, included text and the like) which may be of different file formats and the like. A set of information presenting a query and responses (including a correct answer) is an example of an experience segment.

An API in accordance with the disclosures made herein facilitates creation of the experience segments 152. Preferably, the API facilitates such creation via a creation wizard (e.g., provided in an API toolbox) that performs the creation of such segments in accordance with prescribed rules and functionality. Accordingly the need for manual creation of experience specifications is precluded.

The experience segments 152 are structured in accordance with a specification format specified by an API of the API module. The specification format designates a structure for associating each one of the one of the multimedia assets 158 with corresponding experience segments 152 via an attribute 160. In this manner, the API and its specification format enable structuring of experience segments and integration of multimedia assets (e.g., audio files) into the interaction experience.

Table 2 discloses embodiments of display elements, their attributes, their required and allowed included (i.e., subtending) elements, support of included text, and their method of operation. It should be noted that even though a particular display element may not support an attribute, an experience designer has the option of choosing to include that attribute in the element so that the attribute and its value are inherited by any included elements that do support those attributes.

TABLE 2

| Display Elements | |
|---|---|
| AIML | The root element of the AIML schema, and the default is that all sibling elements (that is, elements that do not have a parent-child relationship) should be played sequentially in the order they occur in the AIML file. |
| CONCURRENT | Allows two elements to be presented concurrently. |
| PAUSE | Temporarily stops the progression of the presentation and displays an image. The presentation resumes when the console detects a mouse click or a press of the space bar, or when the projectionist chooses to resume the presentation. Attributes include img (url of the image to be displayed), height (image height), width (image width), and ground (the background color). |
| QUESTION | Performs feedback information actions on an animation file (e.g., FLASH animation file), displays the animation, and updates the feedback information actions of the animation in real time. Attributes include questionAudio (url of the sound file(s) to play after the introAudio), difficulty (integer value specifying the difficulty of the question), title (title of the question), backgroundMusic (url of the sound file(s) to play in the background), timer (specifies the number of times the countdown timer will tick), questionAudioDirectory (directory where audio files for the QUESTION are stored), url (url of the Flash animation file associated with the QUESTION), questionNum (question number), roundNumber, (question round number), introAudio (url of the sound file(s) to play at the beginning of the animation), postAudio (url of the sound file(s) to be played at the end of the animation), answerNumber (number of ANSWER or CATEGORY elements to include), chooseAnswerMethod (if less than the actual number of ANSWER or CATEGORY included elements, specifies the method that the gaming engine will use to choose which ANSWER or CATEGORY elements will be used, for example, "Random", "LeastUsedRandom", "First" and "Last"), prize (prize to be awarded to the winner of this QUESTION), timerDecrement (amount that the point value of the question will be decremented with each tick of the clock), ampFPS (number of amplitude values per second that should be supplied by real-time sound file analysis for every (non-background) sound file played), ampMax (value to be applied to the loudest section of a sound file), ampMin (amplitude value that represents silence), and numScores (number of top scores from the scoreboard that should be supplied to the Flash animation via the seatName and seatScore variables). Included Elements are <QUESTIONTEXT> [0+], <ANSWER> [0+], and<CATEGORY> [0+]. |
| MOVIE | Displays the specified movie file. At the end of the movie file, the disclosed system automatically proceeds to the next element. Attributes include url (url of the movie to be played), height (movie height), width (movie width), background (the background color), and format (format of the movie). |
| QUESTIONTEXT | Only exists validly as an included element of a QUESTION element. Attributes include questionAnnounceAudio (url of a sound file(s) to be |

TABLE 2-continued

Display Elements

| | |
|---|---|
| | played after the parent QUESTION's questionAudio file and before any sound files specified by a CATEGORY or ANSWER element), answer (specifies answer to a question, if not done so by parent QUESTION). Included text is the text of the question. |
| ANSWER | Only exists validly as an included element of a QUESTION element. Specifies offered and correct answers to a question. Attributes include chosenAudio (url of a sound file(s) to be played after the parent QUESTION's questionAudio file, the QUESTIONTEXT's questionAnnounceAudio file, and the expiration of the timer if the ANSWER is chosen.), answer (valid settings are "true" if this is the correct answer or "false" if it is not) if no ANSWER element of a QUESTION has answer = "true", the question is treated as a question without a correct answer (like a poll or survey question). Included Elements are any other elements. Included text is text of the answer. |
| SLIDESHOW | Show a slide-based presentation. Attributes include type (type of slide show to be shown), url (url of the slideshow file), height and width (height and width to show the presentation), dir (the directory where the slide images reside), prefix (the prefix for the names of the slide image files), postfix (the postfix for the names of the slide image files), firstSlide (the number of the first slide to display), lastSlide (the last slide to display), autoAdvance (number of seconds before the SLIDESHOW is automatically advanced), seatControl (ID of the audience member who is authorized to control the SLIDESHOW), and loop (whether the SLIDESHOW should advance to the next element or back to the first slide at the end). |
| CATEGORY | Acts as a collection of QUESTION elements and as a branchable alternative to ANSWER. Unlike an ANSWER, a CATEGORY element can exist independently of a QUESTION. Attributes include title (category title), categoryNameAudio. (url of the sound file(s) to play when the category is announced), categoryAnswerAudio (url of the sound file(s) to play when the category is chosen), questionNumber (number of QUESTIONs to choose from the included elements), chooseQuestionMethod, method to use to choose QUESTIONs; valid settings are "Ordered", "Random" (default) and "LeastUsedRandom."). Included Element is QUESTION [1+]. |
| AUDIO | Has no visual component. If called as a sequential element, it will play the specified sound file against a blank screen. Attributes include url (url specifying the sound file(s) to play). |
| GAME | Each interactive multimedia experience is initialized with a system environment that includes persistent experience data such as scoreboards and participation data. The GAME tag lets designers temporarily "break out" of the base game environment and have a temporary "game within a game" that will not affect the overall scoreboard. When the game tag is encountered, the gaming engine creates an entirely new game environment and caches the old one. When the close tag for the GAME is encountered, the results of the new game environment are logged separately, and the old gaming environment is restored. This lets designers make small "interim" games that do not affect the overall environment. |
| INCLUDE | Loads the elements from the specified AIML file and replaces itself with those files. Attributes include url (url specifying the location of the AIML file to include), includeNumber (number of elements from the AIML file to include), and includeMethod (if the number of elements in the AIML file is greater than the includeNumber, this specifies the method by which the elements to be included are chosen; valid settings are "Random," "Ordered" (default) and "LeastUsedRandom"). |

It should be noted that global display element attributes (i.e., attributes supported by all display elements) include include (url or location of AIML file), includeNumber (number 1of display elements from AIML file to be included), include Method (specifies method use d to choose display element to be included and the order to be included), includeAt (specifies where alternate display element should be includes), and message (value to be sent to multimedia file via MESSAGE feedback information action).

As eluded to in Table 2, each display element can have one or more included elements. An included element is a display element that is included as a part of another display element. In FIG. 1, the QUESTION display elements have QUESTIONTEXT and ANSWER included elements. Any given display element may require certain included elements to function properly, or it may optionally allow certain included elements. Some display elements treat included elements as branching elements. This means that the display element treats its included elements as alternative branching points, and the included element can become a new experience thread based on the outcome of the experience feedback information.

All elements inherit the attributes of their parent elements. Even if a given display element does not support a certain element, a designer may include the attribute so that the attribute's value is inherited by the element's included elements. For example, an experience designer might specify a round attribute for a CATEGORY element, even though CATEGORY does not support round, so that all of the QUESTION elements included within the CATEGORY will have the round attribute properly set.

Certain display element attributes specify the locations of sound files to be played at a certain point during the respective experience. For those attributes, disclosed systems support the use of sound file linking operators to be includes within a single attribute. Examples of such operators are depicted in Table 3.

TABLE 3

Sound File Linking Operators

| | |
|---|---|
| ( ) | Perform any operations within the parenthesis first |
| \| | Play sound files in a left-to-right order; a corresponding signal from the display element is expected between sound files |
| + | Play the sound files in a left-to-right order back-to-back, and treat them as if they were a single file (Effectively concatenates the files at run-time) |
| ? | Choose one of these files at random |

The sound file linking capabilities are extremely useful in creating a large, complex game with very large stores of audio files. When recording and processing the files, the recording studio and voice talent can record into small, discrete chunks without worrying about how the sound files will be strung together in the final presentation. It allows much of the final sound editing to be performed automatically by the engine according to the designer's specifications.

A disclosed system includes software (i.e., a collection of instructions for controlling operation of a data processing device/system) is configured for performs a plurality of basic tasks. It loads and verifies AIML files that are marked for presentation. It builds and initializes each available interactive experience based on the information and settings in the AIML file. When started, it initializes the experience environment and the experience display. While displaying, it maintains persistent game information and updates the multimedia files in real-time with information about the gaming environment and audience responses. It also logs audience responses and other information about that particular run of the experience. During the presentation, it pre-loads (if necessary) and serves all multimedia files. It monitors the information provided by the base station about audience responses and orders, verifying those responses and reacting accordingly. It serves interfaces for waitstaff, projectionist, and alternative audience interaction devices, and processes the input from them.

To perform these tasks, disclosed systems employs a plurality of core software components. In one embodiment, the core software components comprise a custom multimedia server, an experience engine, an ordering and point-of-sale (POS) integration engine and a base station driver. Each of these components employs instances of a custom interface server. They also communicate with each other using a set of communication tools and protocols.

Custom multimedia servers are preferable for several reasons. First, if multimedia files reside in an external database or on a different machine, the multimedia server can pre-cache files on the local file system to facilitate fast retrieval. Second, it is sometimes convenient, based on the layout of an experience in an AIML file, to pre-load multimedia files into system memory, again speeding delivery to the display to avoid any noticeable system lag. Third, certain multimedia files are treated in a non-standard way by disclosed systems. For example, multimedia files may be analyzed prior to serving them so that information about the file can be fed into the experience engine. Finally, writing a custom multimedia server allows the system to explicitly control such system timing issues as thread priorities and timing of garbage collection. For example, during a presentation, the multimedia server's thread priority is elevated, since interruption of its tasks result in display irregularities; the server can also yield the processor and schedule garbage collection during convenient times (like during a transition between games or screens).

An additional reason to create a custom multimedia server is security and digital rights management. In some embodiments, a multimedia server will serve any file from a specified directory. The system relies on external firewall software to block access to the multimedia server's port by external resources. It is contemplated, however, that the multimedia server can employ its own security policy and implement custom security rules, including encryption of presentations and multimedia. In some cases, when a disclosed system is used for business presentations, a single venue may have several different client companies who upload, preview and display business presentations. Accordingly, embodiments of this disclosed security is desirable.

The experience engine loads, parses and verifies AIML files and drives the experience display (the experience display, in turn, sends requests to the multimedia server for the files that it needs). It maintains all persistent experience data and logs all experience events and audience responses. It also serves the various control and administration interfaces, as well as the interfaces for alternative audience interaction devices. To process audience interaction, the experience engine connects to the base station driver (e.g., via the communication protocols described below) and processes the information it receives according to the AIML settings.

The ordering and POS integration component of the system validates audience orders and maintains order state. To receive orders, the component connects to and processes input from the base station driver. This component also handles any integration with the venue's point of sale system by implementing relevant portions of the POS system's API.

The base station driver communicates with the base station hardware and processes and filters the input from in-seat controllers. It then passes the information to other interested components. Other components can also request that the base station driver issue commands to the keypads (for example, to enable/disable service or to flash the correct/incorrect LED).

In one embodiment, the display technology used to actually handle the visual component of a multimedia experience is a customized version of a standard web browser. In order to accomplish this, the experience engine must translate the specification of an interactive experience (e.g., the AIML file) into HTML and related executable code that can be displayed and/or executed from within the browser. To accomplish this, the custom interface server of a disclosed system is a customized HTML template engine that provides specific functionality to support the novel communication with multimedia files (i.e. feedback information actions) that it provides, and that is free from any unnecessary overhead that would delay template processing. For this reason, in one embodiment, the experience engine includes its own template engine. Because the functionality of the template engine is useful to other components for generating dynamic web-based administrative and interactive interfaces, the template engine is generalized and encapsulated so that all components can use it easily.

The custom interface server operates by reading HTML templates with special tags or codes and replacing those tags or codes with programmatically determined data. This means that the visual layout and appearance of an interface is separated from the underlying data that the interface will display. An experience designer can, therefore, change and customize the layout of the display without any knowledge or contact with the underlying code that supplies the data.

A disclosed system contains a set of communication tools that encapsulate the methods and protocols by which all of the components above communicate. In one embodiment, communication among components of disclosed systems is implemented using TCP sockets. This means that each of the core components could reside on a separate machine. It also means that external applications that are aware of the protocols can communicate with any of the components. By publishing a port location, the communication protocol and security rules, the system can allow 3rd party applications the ability to communicate with each component. Because communication is TCP-based in at least one embodiment of disclosed systems, a 3rd party application can be implemented in any language and on any platform that supports TCP.

Creation of an AIML file is simple for a designer with the technical knowledge necessary to build a multimedia web page, especially when templates for certain game types are provided. The experience creation process could be simplified, however, with a graphical wizard that created the AIML file based on intuitive graphical inputs and that allowed immediate previews of the resulting experience. Such a wizard could be web-based, which would allow designers and presenters to design experiences remotely and would automate the process of uploading multimedia files to a disclosed system at a particular venue. Such a tool would open the advanced functionality of the system to less technical users, such as business presentation designers.

It is contemplated that disclosed systems may include sample AIML documents that simplify the process of specifying an interactive experience. A multimedia designer would, however, need to be familiar with the requirements of the system (e.g., the feedback information actions discussed herein) in order to create multimedia files that react properly to input of the experience engine. A very useful feature is disclosed herein to be the generation of a "skeleton" multimedia file, based on the AIML file's specifications. For example, after the designer creates an AIML file that specified the use of a Flash file called "question.swf" in a certain system directory, a disclosed system would test for the existence of that file. If it does not exist, the disclosed system could generate a generic, well-commented version of the file that employed and generated the correct Flash variables, methods, events and messages in order to be able to respond properly to feedback information actions. The designer could then open the file using a design tool (e.g., Macromedia's Flash authoring tools) and customize the file as necessary.

An additional method of simplifying experience creation includes embedding support for a disclosed system directly into the multimedia design tools that designers often use. Tools configured in such a manner would, like the graphical experience design tools, allow the advanced functionality of the platform to be used by a less technical user. Examples of such multimedia design tools include Macromedia's Flash authoring tools and Microsoft's PowerPoint. Both of these tools (i.e., software packages) have mechanisms that allow 3rd parties to create software "plug-ins" to add functionality to the package. Such a plug-in for PowerPoint, for example, would allow a business presentation designer to insert an audience poll into a presentation that was formatted to operate with a disclosed system, and that displayed a chart that reflected the real-time audience responses.

Turning now to discussion of specific embodiments of disclosed methods and systems, an interactive multimedia apparatus (IMA) 100 capable of carrying out interactive multimedia functionality in accordance with embodiments of the disclosures made herein is depicted in FIG. 2. The IMA 100 comprises an integrated interactive multimedia platform (IIMP) 102 having a multimedia presentation apparatus 104, environment controls 106, a point-of-sale (POS) system 108 and a network system 110 connected thereto. The multimedia presentation apparatus 104 includes a projection system (i.e., a display) and an audio system. A commercially available or proprietary multimedia presentation apparatus (e.g., as used in a movie theater) is an example of the multimedia presentation apparatus 104 depicted in FIG. 2. Lighting controls, climate controls, seating sensation controls and the like are examples of the environment controls 106 depicted in FIG. 2. A commercially available concession POS system is an example of the POS system 108 depicted in FIG. 2. The Internet is an example of the network system 110 depicted in FIG. 2.

The IIMP 102 includes a console 112, a base station 114 and audience control apparatus 116. The IIMP 102 provides an integrated combination of functionality that enables custom-configured, media-rich interactive experiences to be instantiated and facilitated. Examples of such functionality include large venue interactive experience functionality, query-response information acquisition functionality, POS functionality, and distributed interactive experience functionality via inter-installation communication.

The console 112 is placed in relatively close proximity to the multimedia presentation apparatus 104 and, preferably, to the environment controls 106. For example, in a movie theater embodiment, the console 112 is placed in the projection booth where it would be connected to the theater's multimedia presentation system and projection booth controls. Preferably, the combination of the console 112 and the multi-media presentation system 104 supports all major media types (mp3, mpeg video, avi, QuickTime, Flash, etc) and is capable of serving DVD-quality video and full Dolby® surround sound audio via the multimedia system 104 and an associated sound system, respectively. Additionally, the console 112 locally stores and retrieves interactive multimedia assets such as movie, sound and animation files.

The console 112 interprets interactive experience definition files that specify how associated multimedia assets (e.g., video files, presentation files, text files, animation files, etc) should react to real-time audience participation. Experience definition files and experience definition objects are embodiments of experience information instantiations. The console 112 communicates with the base station 114 to gather audience responses and integrate those responses into facilitation of the interactive experience. The console 112 also tracks and saves audience responses so they can be included in reports, used to improve interactive experiences, or uploaded to scoreboards or databases (e.g., via the network system 110). Additionally, the console 112 connects to point-of-sale (POS) systems of the installation venue, allowing concession ordering via interactive devices (e.g., seat mounted devices) of the audience control apparatus 116. A system of an installation venue (e.g., a venue POS system) that is not part of an interactive multimedia platform is defined herein to be a non-integrated system.

The base station 114 is connected (i.e., coupled) between the console 112 and the audience control apparatus 116. The base station 114 collects gathers input information (e.g., responses) from the audience control apparatus 116 and forwards the input information to the console 112. The base station 114 and the audience control apparatus 116 may be commercially available hardware or proprietary hardware that is capable of providing required functionality. The audience control apparatus 116 includes a plurality of interactive devices readily accessible by an audience of experience participants (i.e., system users). An audience of experience participants is defined herein as a plurality of experience participants who are jointly participating in an interactive experience (e.g., viewing one large movie screen). Preferably, the console 112 and base station 114 support several hundred to thousands of interactive devices, enabling the IIMP 102 to be scalable to large venues.

The console 112 comprises hardware and software components. A data processing system such as a server running a conventional operating system is an example of the hardware component of the console. As discussed in greater detail below, functionality modules configured for and capable of enabling integrated interactive multimedia functionality as disclosed herein comprise respective portions of the hardware and/or software components of the console 112.

In one embodiment, console and server-side software is coded in a Java format, thereby allowing it to be relatively easily ported to essentially all major operating systems. Also in one embodiment, the console 112 implements its own HTTP server to handle communication between the various software components of the console 112. Through implementation of its own HTTP server, multi-location gaming and heterogeneous input devices can be used and integration with other components of the IIMP 102 (e.g., accessory input devices) is as simple as implementing a set of HTTP calls. Sockets can be easily secured and encrypted for sensitive applications.

One embodiment of facilitating communication between the console 112 and other hardware components of the IIMP 102 (e.g., interactive devices of the audience control apparatus 116) includes assigning a unique hierarchical address to each hardware component. An example of such a hierarchical address includes a device type (e.g., 1 byte of information), a device version (e.g., 1 byte of information) and a device identifier (e.g., 2 bytes of information). The hierarchical nature of the address ensures that the console 112 can distinguish between different types and versions of devices and firmware based on address, and that enough address space is available for thousands of devices.

Figure 3:
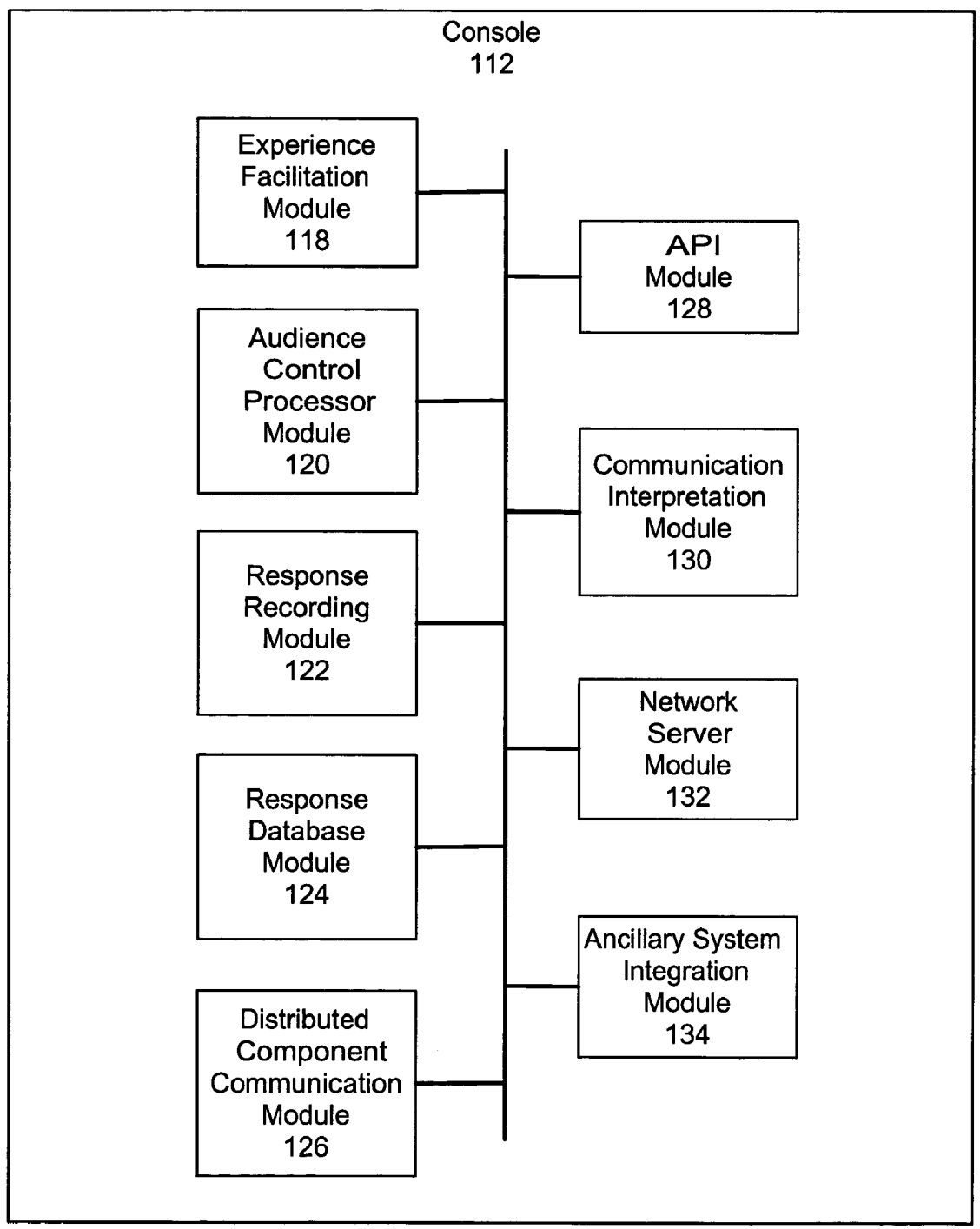
FIG. 3 depicts an embodiment of various functionality modules comprised by a console of the IMA depicted in FIG. 2.

FIG. 3 depicts an embodiment of various functionality modules comprised by the console 112. In the depicted embodiment, the console 112 includes an experience facilitation module 118, an audience control processor module 120, a response recording module 122, a response database module 124, a distributed component communication module 126, an API (Application Programmers Interface) module 128, a communication interpretation module 130, a network server module 132 and an ancillary system integration module 134. The functionality modules are integrated (e.g., interconnected via a common bus) for enabling interaction therebetween.

The experience facilitation module 118 performs processes for carrying out the interactive experience. Broadly speaking, the experience facilitation module is the experience engine that ties together experience functionality for enabling the interactive experience to be facilitated in accordance with an associated interactive experience file. Examples of operations performed by the experience facilitation module processes include interpreting interactive experience definition files for specifying how associated multimedia assets are outputted, assessing audience feedback, outputting interactive experience information dependent upon audience feedback, processing distributed experience information and the like.

In one embodiment, the experience facilitation module includes various front-end components that facilitate interfacing with the multimedia presentation apparatus 104 and/or the environmental controls. Examples of such front end components include element applets, system CODECs, browser plug-ins and other control/interface components.

The audience control processor module 120 facilitates communication of information between the console 112 and the audience control apparatus 116. The response recording module 122 operates at least partially in conjunction with the response database module 124 for facilitating functionality such as storing responses and enabling response information to be translated into feedback information actions.

To facilitate installation, configuration and integration, the software components of the console 112 are organized as a set of discrete distributed components (i.e., software components of the various functionality modules) whose communication is facilitated by the distributed component communication module 126. For example, software components responsible for facilitating presentation of multimedia assets need not even reside on the same integrated multimedia system as the software components responsible for processing interactive experience files or the software components that handle and process interactive device information. In this manner, communication between the various discrete distributed components can be handled through a socket-based messaging system, wherein they are only connected via a common TCP/IP-capable network in order to function as a single unit.

The API module 128 is an interactive experience specification format interpreter. It enables multiple multimedia assets of different instantiation formats (e.g., multimedia file formats) to be integrated into an information instantiation (e.g. an experience specification file) defining a designated interactive experience. The API module 128 is used by an Experience Designer to compose interactive experiences such as interactive games, interactive presentations, interactive educational programs and the like. The API comprises the specification format, instructions and tools that designers use to create an interactive experience.

The specification format of the API is a hierarchical language that allows the Experience Designer to specify specifically which multimedia assets they want to show, the timing of the display, and the way that it will respond to user input. The API supports common interactive situations like quizzes, scoreboards, voting, etc. Extensible Mark-up Language (XML) is an embodiment of a language used for specifying interactive experiences (i.e., an XML-based experience file) implemented via an integrated interactive multimedia platform as disclosed herein.

The communication interpreter module 130 enables functionality provided by a system external to the IIMP 102 (e.g., the POS system 108) to be integrated with IIMP 102. Through use of functionality provided by the API module 128, communication interpreter modules, such as the communication interpreter module 130 depicted in FIG. 3, can be added to the IMS 100. In this manner, a message from the IIMP 102 can be correctly interpreted and translated into a format (e.g., signal) that can be understood by the POS system 108. Accordingly, this type of functionality and capability makes it easy, for example, for an item ordered at a seat of an interactive experience participant to be automatically added to the participant's (i.e., audience member's) bill. Similarly, an automated lighting system that uses the MDI show control protocol can be controlled via the IIMP 102, thereby giving experience designers the ability to synchronize light effects with interactive experiences facilitated by the console 112. Preferably, the communication interpreter module 130 is created via the API module 128.

The network server module 132 provides a secure network (i.e., on-line) link to the console 112. Through such link to the console, functionality (e.g., of the console 112 and/or ancillary IMS components) that requires transfer of information over a network connection can be performed. Examples of such ancillary IMS components include remote gaming engines (e.g., distributed gaming systems), remote administration/control components, remote reporting components and the like. One embodiment of the network server module 132 is Internet server software based on J2EE technology, thus making it a convenient interface for interfacing with existing, legacy databases, other online applications, or e-commerce engines.

Examples of functionality enabled by the network server module 132 includes hosting experience-related web sites where game players (i.e., experience participants) register for the game, view past scores and compare results with other players. Another example of such functionality includes enabling experience designers to perform experience development tasks such as securely uploading PowerPoint and multimedia files, adding interactive quizzes and polls to business presentations, and previewing/verifying presentation contents. Still another example of such functionality includes enabling experience participants to view and print reports on quiz scores and poll results. Yet another example of such functionality includes enabling experience designers (e.g., as part of their custom-configured experience) to request that prospective experience participants utilize functionality provided by the network server module 132 to confirm experience reservations and/or to assign seats to confirmed experience participants. Yet another example of such functionality includes serving response data from a database of the console 112 to ancillary IMS components.

Turning now to detailed discussion of base stations and interactive devices, base stations and their corresponding interactive devices (e.g., the base station 114 and interactive devices of the audience control apparatus 116 depicted in FIG. 2) may be wireless or wired. Preferably, each base station interfaces with the console via a common communications port (e.g., a serial port or USB port). Because a particular venue (e.g., a theater) may contain a mix of wired and wireless base station-interactive/device systems and because multiple base stations can be attached to a console, a single console may have many base stations for allowing larger numbers of devices to be served via that particular console. While wireless implementations are faster and easier to install and their associated interaction devices are mobile, wired implementations systems are generally less expensive.

In one embodiment of a wired base station/interactive device system, the wired base station and corresponding interactive devices include a communications component and a power component. The communications component includes a signal level adjustment circuit to accommodate different power levels for communication required by a console, signal boxes and interactive devices. The power component includes a power transformer to convert commonly available electricity levels (e.g. 120V AC) to a low direct current (e.g. 24V DC). The communication and power components connect to a communication bus such as a common wire set (e.g. RJ45) connected between a signal box (i.e., a relay point) and the interactive devices. The signal box relays signals to the wired base station. In one embodiment of the signal box, visual and/or audible identification means is provided for notify service personnel (e.g., wait staff personnel) of a particular location of an experience participant that has requested a POS interaction (e.g., purchase/delivery of food, merchandise, etc).

In one embodiment of a wireless base station/interactive device system, the wireless base station and corresponding interactive devices include each include a receiver/transmitter chipset and communications circuitry that process and adjust signals. The receiver/transmitter pair of the base station communicates with the receiver/transmitter pair of the base station. The base station and interactive devices are powered by a direct current power source such as a transformer or battery power.

Unlike conventional interactive devices (e.g., proprietary handheld interactive devices or temporarily positioned interactive devices), interaction controllers a disclosed herein integrate directly into the environment. For example, in an installation in a movie theater, such interactive devices are shaped like and take the place of a traditional theater seat armrest.

Figure 4:
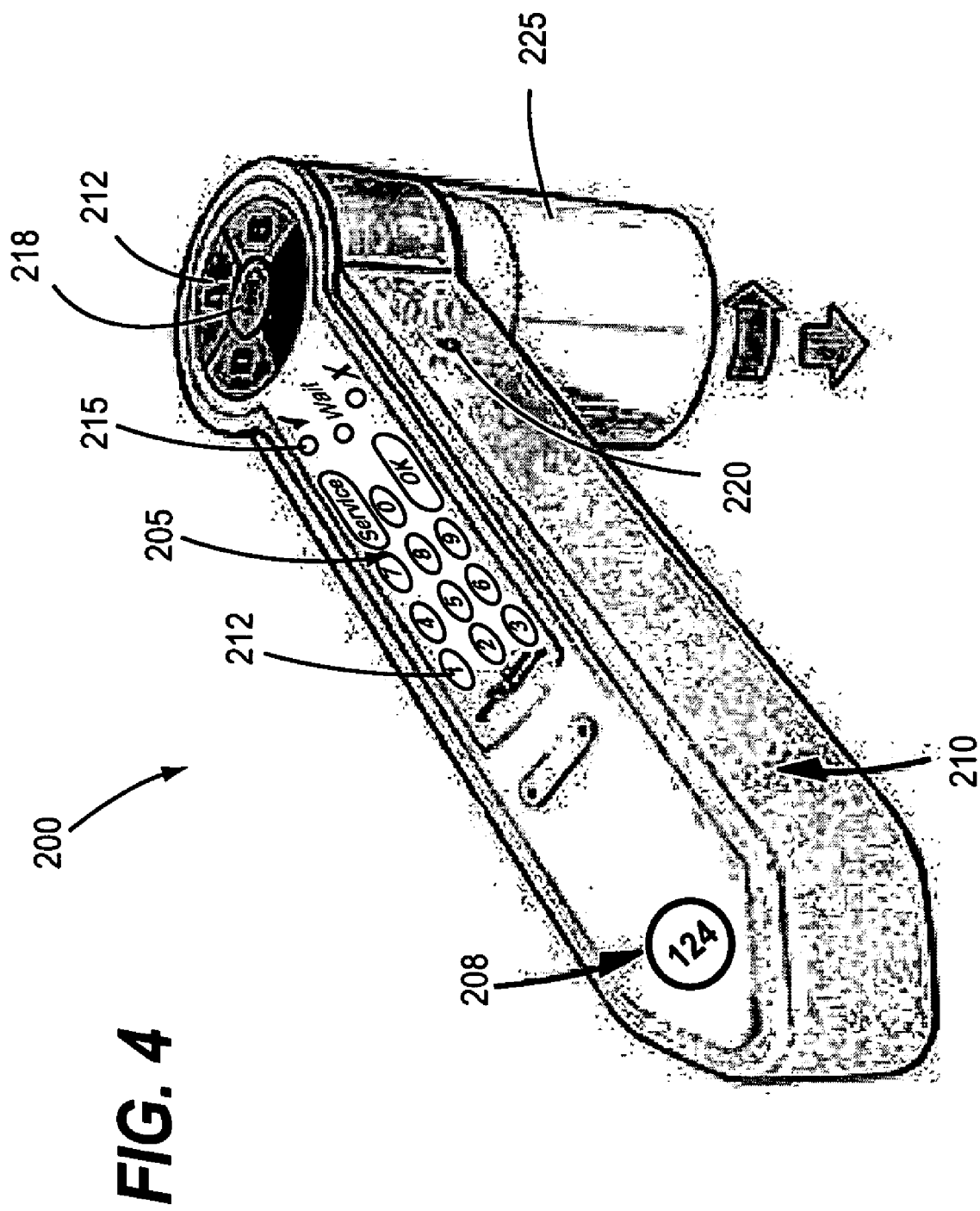
FIG. 4 depicts an interactive device in accordance with an embodiment of the disclosures made herein.

FIG. 4 depicts an interactive device 200 (i.e., a response controller) in accordance with an embodiment of the disclosures made herein. The interactive device 200 is an example of a seat-mounted interaction device in that it is capable of replacing an armrest of a theater seating apparatus. The interaction device 200 is configured for providing integrated interactive, information entry, order request capability, and individual user feedback functionality. Whether wired or wireless, the interactive device 200 includes a keypad user interface 205 (i.e., an input means) connected to control circuitry within a housing of the interactive device 200. A printed circuit board having a microcontroller therein that controls/enables operation of one or more of keypad scanning and communications software, power regulation components and signal processing components is an example of the control circuitry. Preferably, the interactive device 200 includes a visual location identifier 208 (e.g., a seat number) for use in facilitating the interactive experience functionality (e.g., query response, placing POS orders, etc).

The user interface 205 includes a plurality of response buttons 212 (i.e., selectable inputs) and one or more lights 215. The response buttons 212 allow functionality such as experience interaction and POS interaction to be performed via responses made using the response buttons. The one or more lights 215 (e.g., LED's) can be triggered (e.g., by a console) to supply user feedback (i.e., visual user feedback) such as an indication of an 'OKAY' status (e.g., order received successfully), a 'WAIT' status (e.g., order confirmation pending) or an 'ADVERSE' status (e.g., order not accepted or received successfully). The plurality of response buttons 212 and the one or more lights 215 are examples of an information input portion and an information output portion, respectively, of a user interface.

The response buttons 212 of the keypad 205 are used for participating in the interactive experience and/or for facilitating POS functionality. For example, an answer to a question is responded to by pressing one or more keys corresponding to the participants answer. Similarly, the participant may use the response buttons 212 for ordering a food or snack (e.g., entering a number, indicated in a menu, which corresponding to a desired snack).

The keypad 205 includes a specified-item 218 that is used in conjunction with POS functionality. A specified item (e.g. a preferred beverage) of the experience participant is associated with the specified-item button 218. When the specified-item button 218 is depressed, an order for the specified item is automatically placed via an associated POS system. The specified item may be pre-defined or specific to/specified by the experience participant. Not only does this functionality simplify requesting another one of the specified item, but it also precludes the experience participant's attention from diverted a significant degree of their attention away from the interactive experience in which they are participating.

Accordingly, an interactive controller in accordance with an embodiment of the disclosures made herein (e.g., the interactive controller 200 depicted in FIG. 4) enables unique services to a venue such as a theater to be provided. An example of such unique services include integration with POS systems in a manner that allows 'in-seat' ordering of concession items (e.g., food and beverages) via the interactive controller 200 depicted in FIG. 4. In a movie theater, for example, concession sales account for the vast majority of theater revenue. But, the concession sales drop sharply after the start of a movie because patrons can't get the attention of the wait staff. The combination of POS system integration and in-seat ordering is advantageous and useful, as it provides a convenient, effective and simple means for continuing to order concession items even after the movie starts.

The interactive device 200 includes an expansion port 220, which allows an 'add-on' interactive device (like a special-purpose keypad, keyboard or joystick) to be connected to the associated integrated interactive multimedia platform. The additional input device can use the power and communications circuitry of the interactive device 200, thus reducing size, cost and complexity of the add-on interaction device. The interaction device 200 includes a battery compartment 225 for enabling battery power (i.e., primary or back-up power) to be implemented.

An IIMP as disclosed herein may include non-interactive devices that allow a console of the IIMP to control electro-mechanical relays via an associated base station. For example, an API of the IIMP includes commands that allow a designer to dim or shut off theater lights and/or trigger effects. An electromechanical relay can be either wired or wireless. In one embodiment, they comprise essentially the same components as wired or wireless interactive devices. The exception being that the electromechanical relays will typically not have interactive capabilities and they will include circuitry that activated and deactivates certain actions/functionality based on signals from the console.

Figure 5:
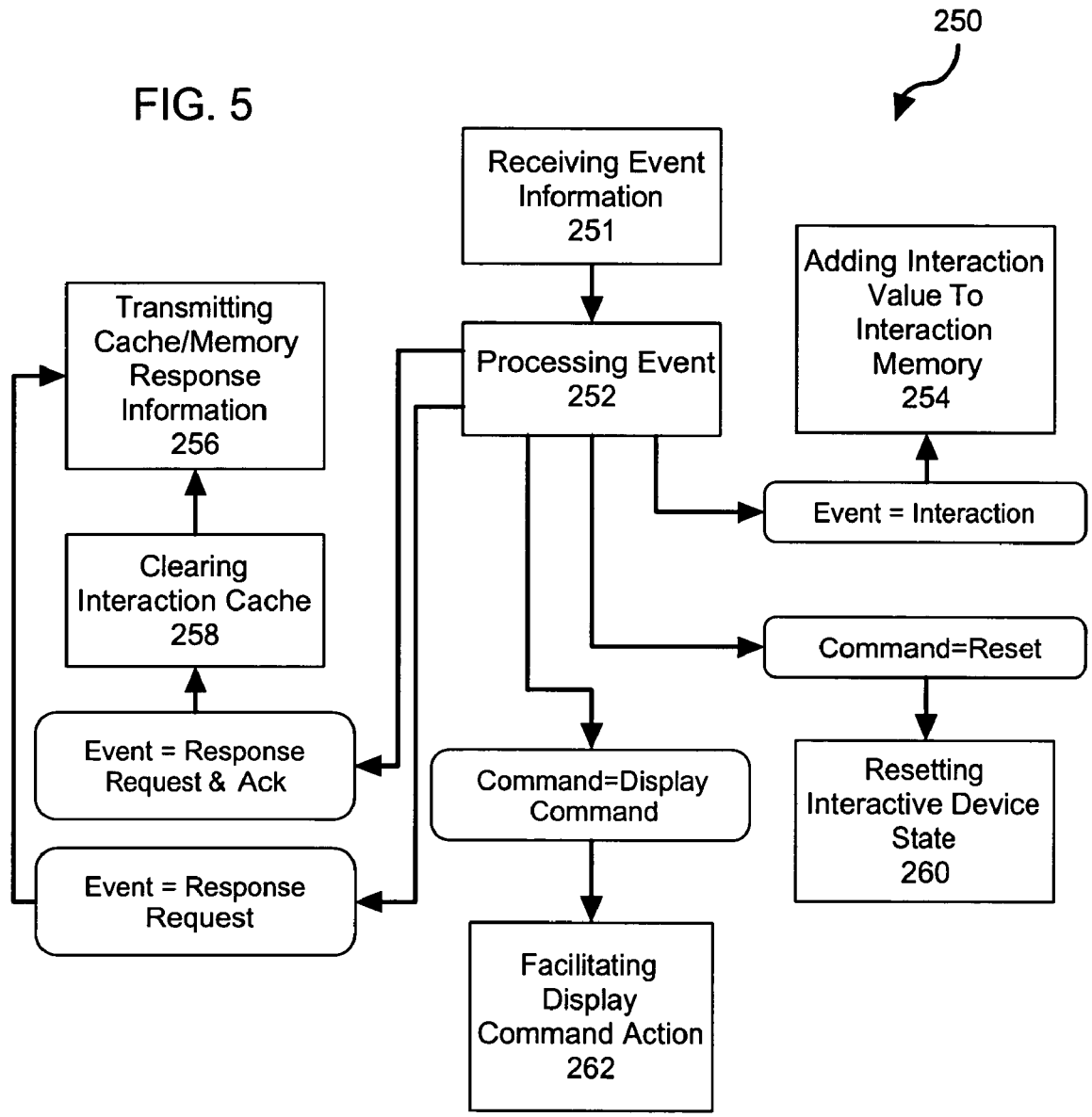
FIG. 5 depicts an embodiment of an interactive device process flow sequence.

FIG. 5 depicts an embodiment of an interactive device process flow sequence 250 capable of carrying out interaction device functionality as disclosed herein. An audience control apparatus including an interactive device (e.g., the audience control apparatus 116 depicted in FIG. 2) is an example of an apparatus capable of carrying out the interactive device process flow sequence 250 depicted in FIG. 5. In facilitating the interactive device process flow sequence 250, an operation 251 receives event information from an interactive device and/or from a data processing system (e.g., the console 112 depicted in FIG. 2). After receiving event information, an operation 252 is performed for processing the corresponding event. Examples of events include interaction events received from the interactive device, command events received from the data processing system and response request events received from the data processing system.

When the event is an interaction event, processing the event includes performing an operation 254 for adding an interaction value corresponding to the interaction event to an interaction memory. When the event is a response request (e.g., in association with a polling operation for gathering responses), processing the event includes performing an operation 256 for transmitting the interaction memory response and/or any interaction cache response for reception by the data processing system. When the event is a response request with receipt acknowledgement, processing the event includes performing an operation 258 for clearing interaction cache in addition to performing the operation 256 for transmitting the interaction memory response and/or any interaction cache response for reception by the data processing system.

When the event is a reset command, processing the event includes performing an operation 260 for resetting a state of the interactive device. Examples of reset states include a state associated with a new experience participant, a state associated with new interface functionality (e.g., a new, updated and/or experience-specific response functionality). When the event is a display command, processing the event includes performing an operation 262 for facilitating the display command. Examples of facilitating the display command include illuminating an LED of the interactive device, de-illuminating an LED of the interactive device and outputting specified information to a display of the interactive device.

Figure 6:
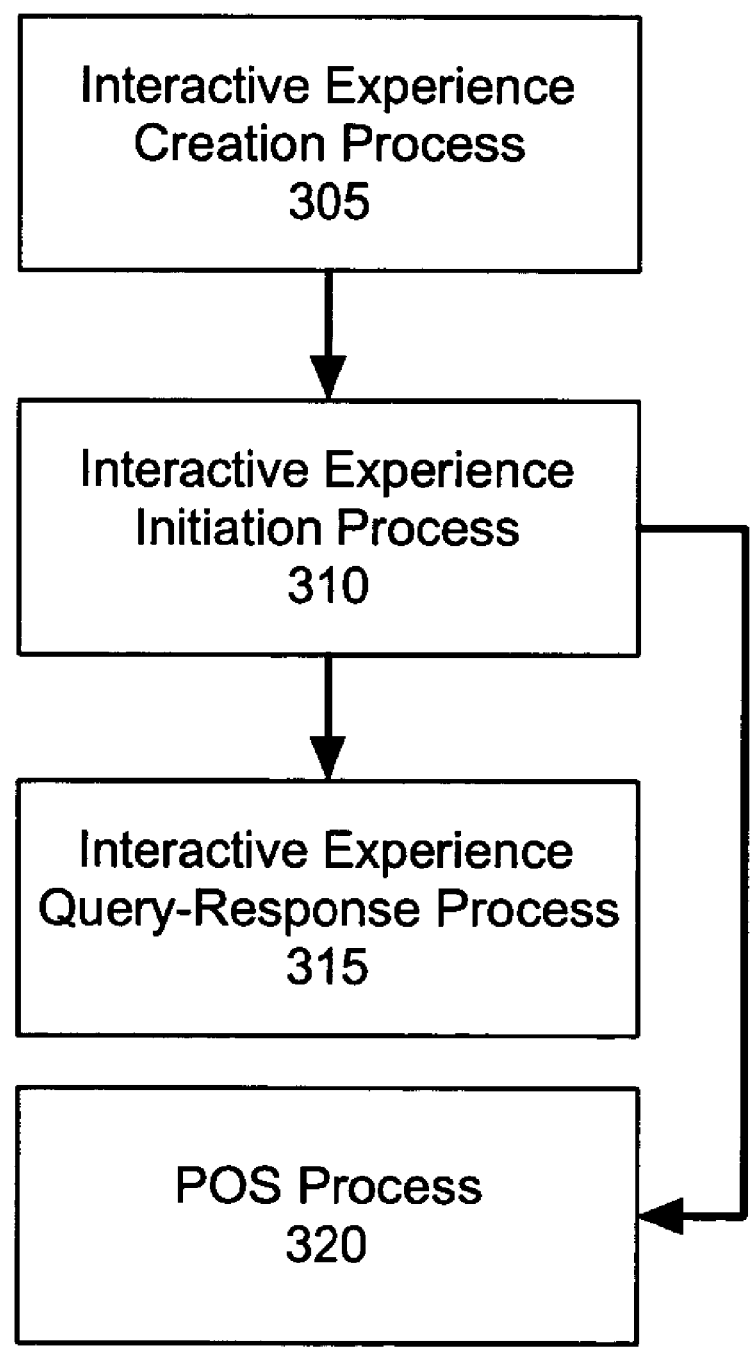
FIG. 6 depicts an embodiment of a method for carrying out interactive experience functionality in accordance with an embodiment of the disclosures made herein.

FIG. 6 depicts an embodiment of a method 300 for carrying out interactive experience functionality in accordance with an embodiment of the disclosures made herein. Specifically, the method 300 is configured for carrying out the integrated combination of functionality, discussed above in reference to FIGS. 2 and 3, that enables custom-configured, media-rich interactive experiences to be created and facilitated. A console in accordance with an embodiment of the disclosures made herein (e.g., the console 112 depicted in FIG. 2) is capable of facilitating the method 300 depicted in FIG. 6.

The method 300 includes an interaction experience creation process 305, an interactive experience initiation process 310, an interactive experience query-response process 315 and a POS process 320. The interactive experience creation process 305 is performed for creating an interactive experience definition file that specifies the information defining the interactive experience. After the interactive experience file is created, the interactive experience initiation process 310 is performed to begin facilitation of the interactive experience (i.e., via implementation of the interactive experience definition file), followed by the interactive experience facilitation process 315 being performed for implementing the experience defined in the interactive experience definition file. In this manner, the interactive experience is created and facilitated.

Figure 7:
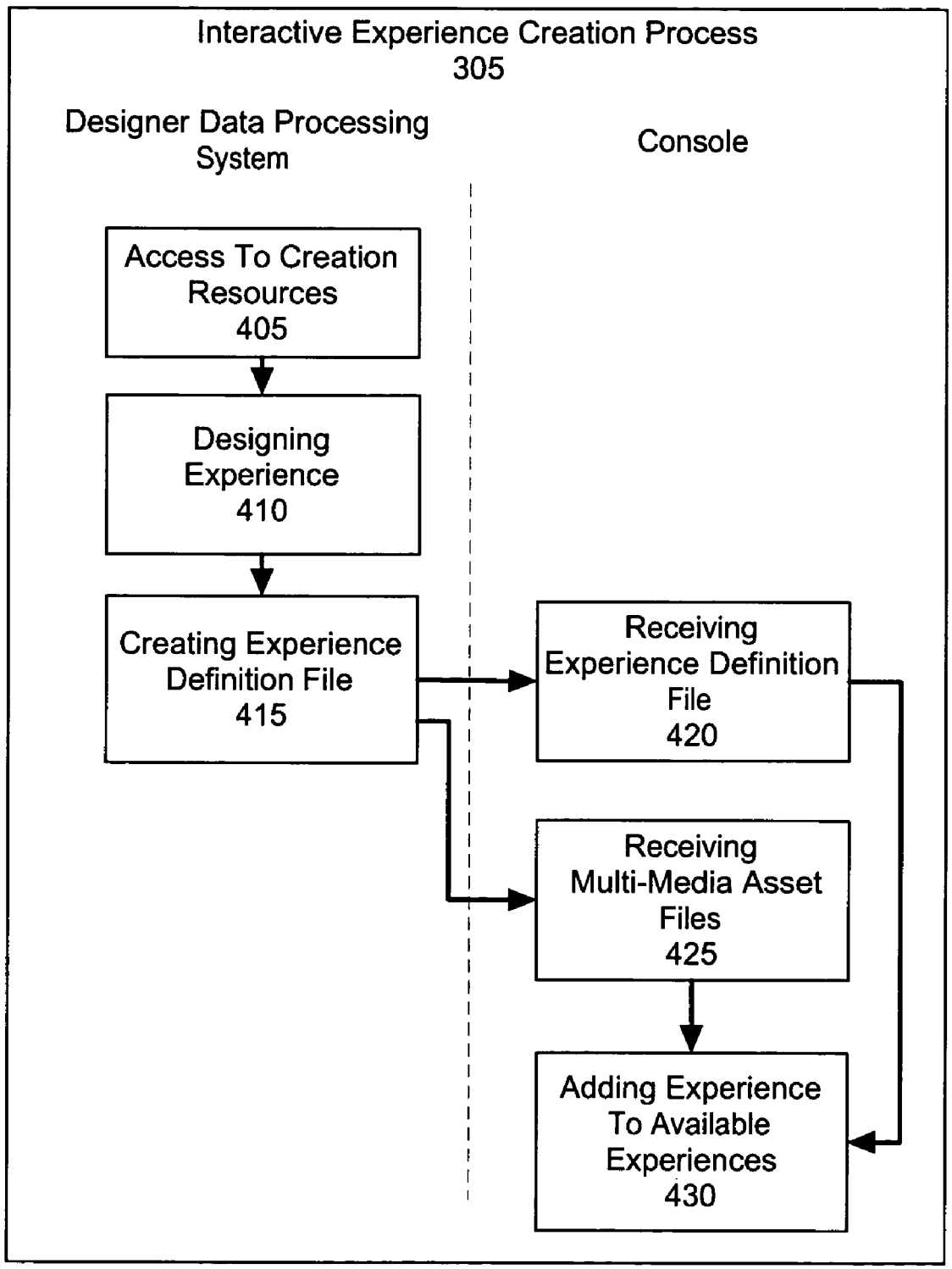
FIG. 7 depicts an embodiment of the interactive experience creation process depicted in FIG. 6.

FIG. 7 depicts an embodiment of the interactive experience creation process 305 depicted in FIG. 6. In response to a designer data processing system issuing a request for creating a new interactive experience by a person who desires to create a new interactive experience (i.e., an experience designer), the designer data processing system (e.g., designer personal computer) performs an operation 405 for access to authorized platform-provided creation resources (e.g., content, tools, wizards, etc). The resources may be available locally (e.g., on the designer data processing system), remotely (on the console) or a combination of both. Authorized platform-provided creation resources may include all of or less than available platform-provided creation resources. For example, certain experience designers may have authorization to different platform-provided creation resources than others.

After access the authorized platform-provided creation resources, the designer data processing system performs an operation 410 for facilitating design of an interactive experience data, followed by an operation 415 for creating an experience definition file corresponding to the designed interactive experience. After creating the experience definition file, the console performs an operation 420 for receiving the experience definition file and an operation 425 for receiving multimedia file(s) associated with the experience definition file. Uploading files over a network connection (e.g., via network server software) is an example of receiving the experience definition file and receiving multimedia file(s) associated with the experience definition file. After receiving the experience definition file and receiving multimedia file(s) associated with the experience definition file, console performs an operation 430 for adding the interactive experience to a list of available experiences.

Figure 8:
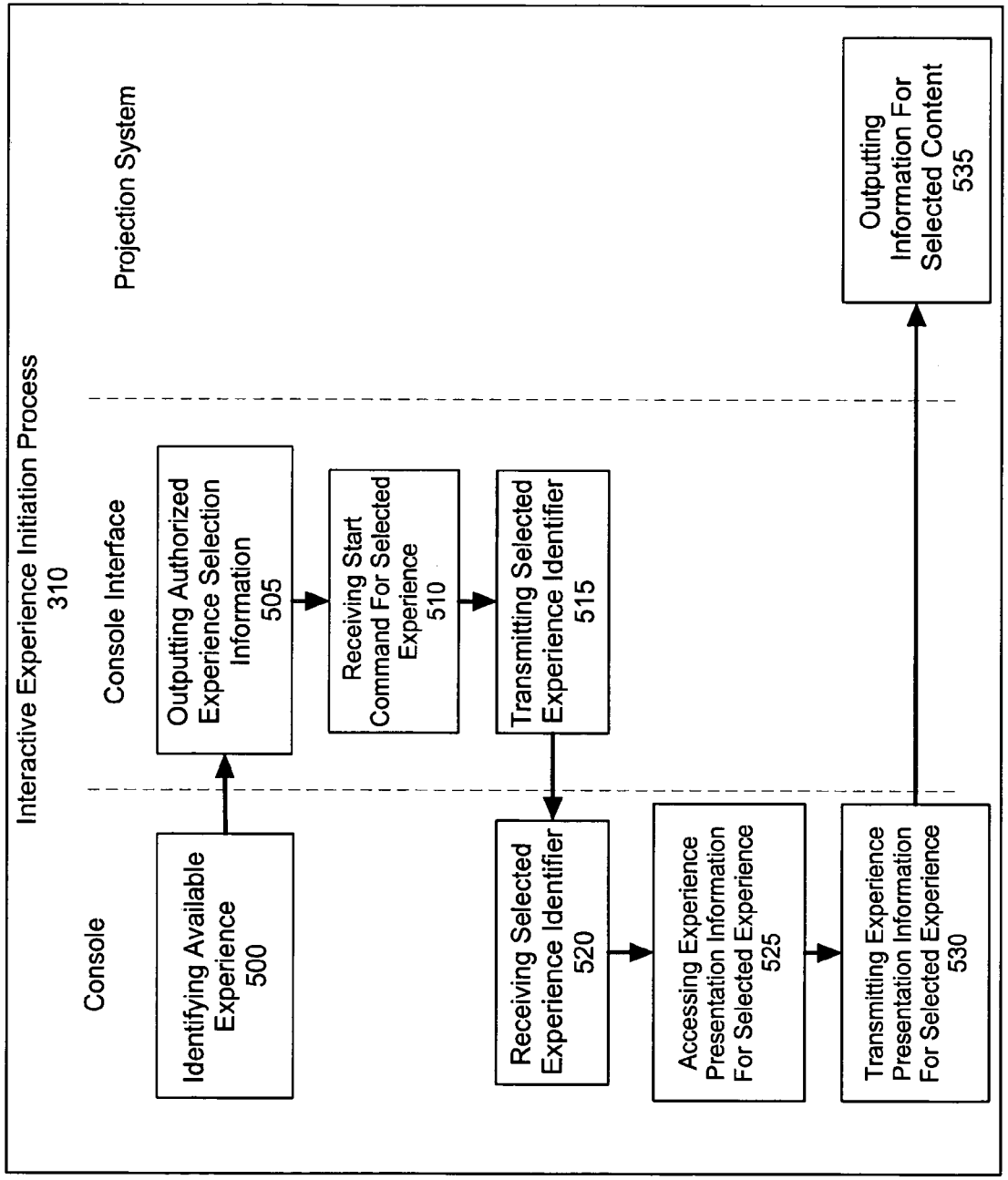
FIG. 8 depicts an embodiment of the interactive experience initiation process depicted in FIG. 6.

FIG. 8 depicts an embodiment of the interactive experience initiation process 310 depicted in FIG. 6. A console performs an operation 500 is performed for identifying authorized experiences. Authorized experiences may represent all of or less than available experiences. For example, some interactive experiences may not be accessible to all persons authorized to facilitate initiation of interactive experiences (i.e., experience facilitators). In response to the authorized experiences being identified, a console interface performs an operation 505 for outputting (e.g., visually, audibly, etc) authorized experience selection information (e.g., titles, context, length, creator, etc). Examples of outputting include displaying visually, playing audibly and printing. After outputting the authorized experience selection information and in response to the console interface performing an operation 510 for receiving an initiation command for a particular interactive experience (e.g., an experience facilitator selecting a particular selection on a touch screen), the console interface performs an operation 515 for transmitting experience identifier information of the selected interactive experience (e.g., an experience identification code) for reception by the console, followed by the console performing an operation 520 for receiving the experience identifier information of the selected interactive experience.

In response to receiving the experience identifier information of the selected interactive experience, the console performs an operation 525 for accessing experience presentation information of the selected interactive experience (e.g., experience definition file and associated multimedia files). The console performs an operation 530 for transmitting the experience presentation information of the selected interactive experience for reception by a multimedia presentation apparatus after the console accesses the experience information. In response to receiving the experience information, the multimedia presentation apparatus performs an operation 535 for outputting (e.g., visually and audibly) the selected interactive experience to an audience.

The embodiment of the interactive experience initiation process 310 discussed above in reference to FIG. 8 depicts a manual start implementation via a local interface (i.e., the console interface). In another embodiment, the operations performed by the local interface in FIG. 8 are instead performed by a remote interface (e.g., over a network connection), thereby representing a remote start implementation of the interactive experience initiation process. In yet another embodiment, the console receives scheduling information in addition to experience information and the interactive experience is presented in accordance with the scheduling information (e.g., a scheduled start), thereby representing a scheduled start implementation.

Figure 9:
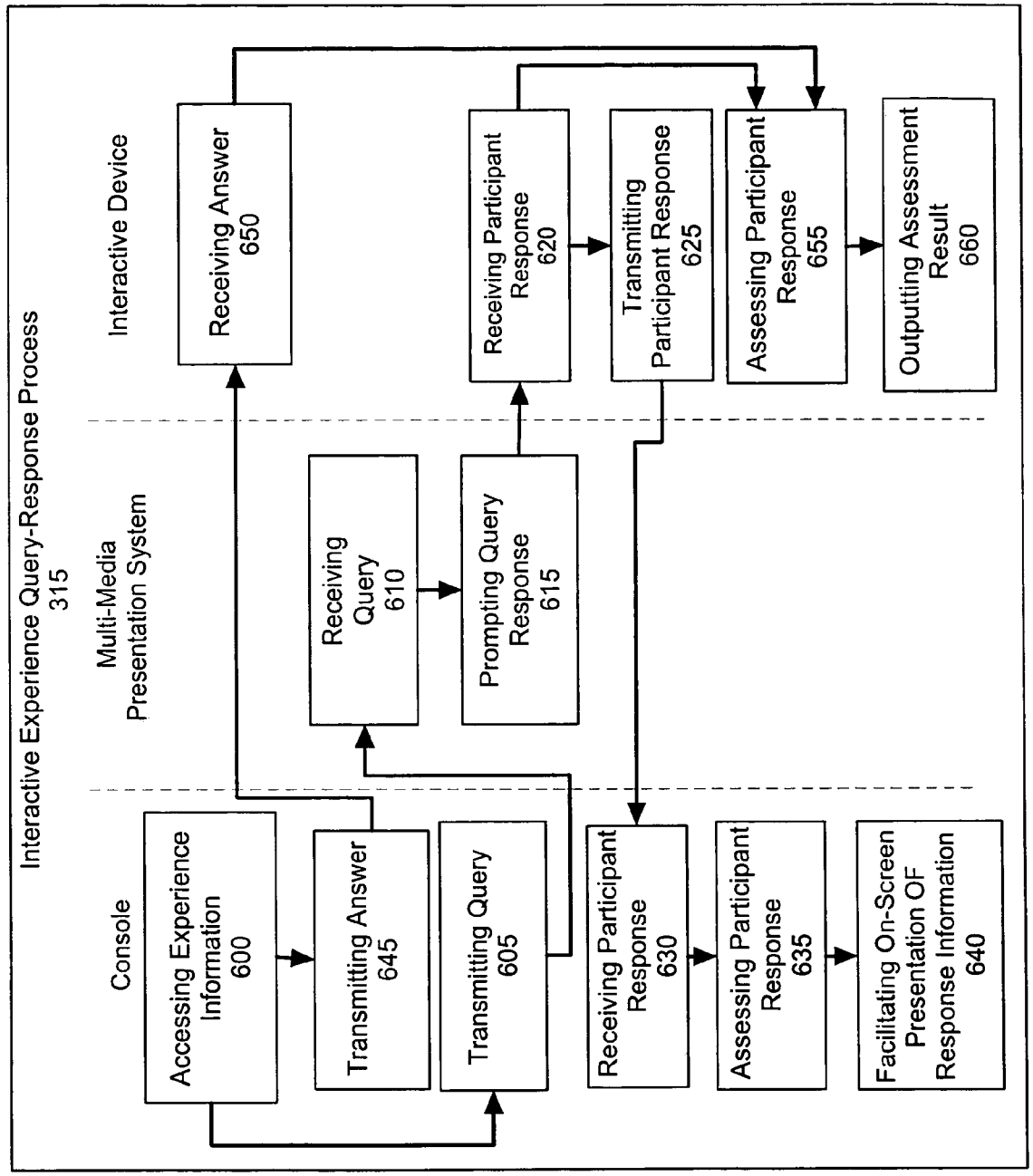
FIG. 9 depicts an embodiment of the interactive experience query-response process depicted in FIG. 6.

FIG. 9 depicts an embodiment of the interactive experience query-response process 315 depicted in FIG. 6. A console performs an operation 600 for accessing experience information. The experience information includes a query and a correct answer to the query. In response to accessing the experience information, the console performs an operation 605 for transmitting the query for reception by a multimedia presentation system. In response to the multimedia presentation system performing an operation 610 for receiving the query, the presentation system performs an operation 615 for prompting a response to the query (e.g., audibly, visually, etc).

After the presentation system performs the operation 615 for prompting the response to the query, the interactive device performs an operation 620 for receiving a participant response (i.e., the participant enters a response into the interactive device), followed by an operation 625 for transmitting the participant response for reception by the console. After the console performs an operation 630 for receiving the participant response, the console performs an operation 635 for assessing the participant response. Comparing the participant response to a correct response are examples of assessing the participant response. After assessing the participant response, the console performs an operation 640 for facilitating on-screen presentation of response information (i.e., displaying audience-specific information such as correct answer and aggregate scoring).

FIG. 9 depicts a sequence of operations (i.e., an optional sequence of operations) configured for enabling a correctness of the candidate response to be assessed and outputted by the audience device. The sequence of operations begins with the console performing an operation 645 for transmitting the correct answer for reception by the interactive device. In response to the interactive device performing an operation 650 for receiving the answer, the interactive device performs an operation 655 assessing the correctness of the participant response (received at the operation 620) in view of the answer (e.g., correct or incorrect). In response to assessing the correctness of the participant response, an operation 660 is performed for outputting the resulting correctness (e.g., via illumination of a particular LED).

Figure 10:
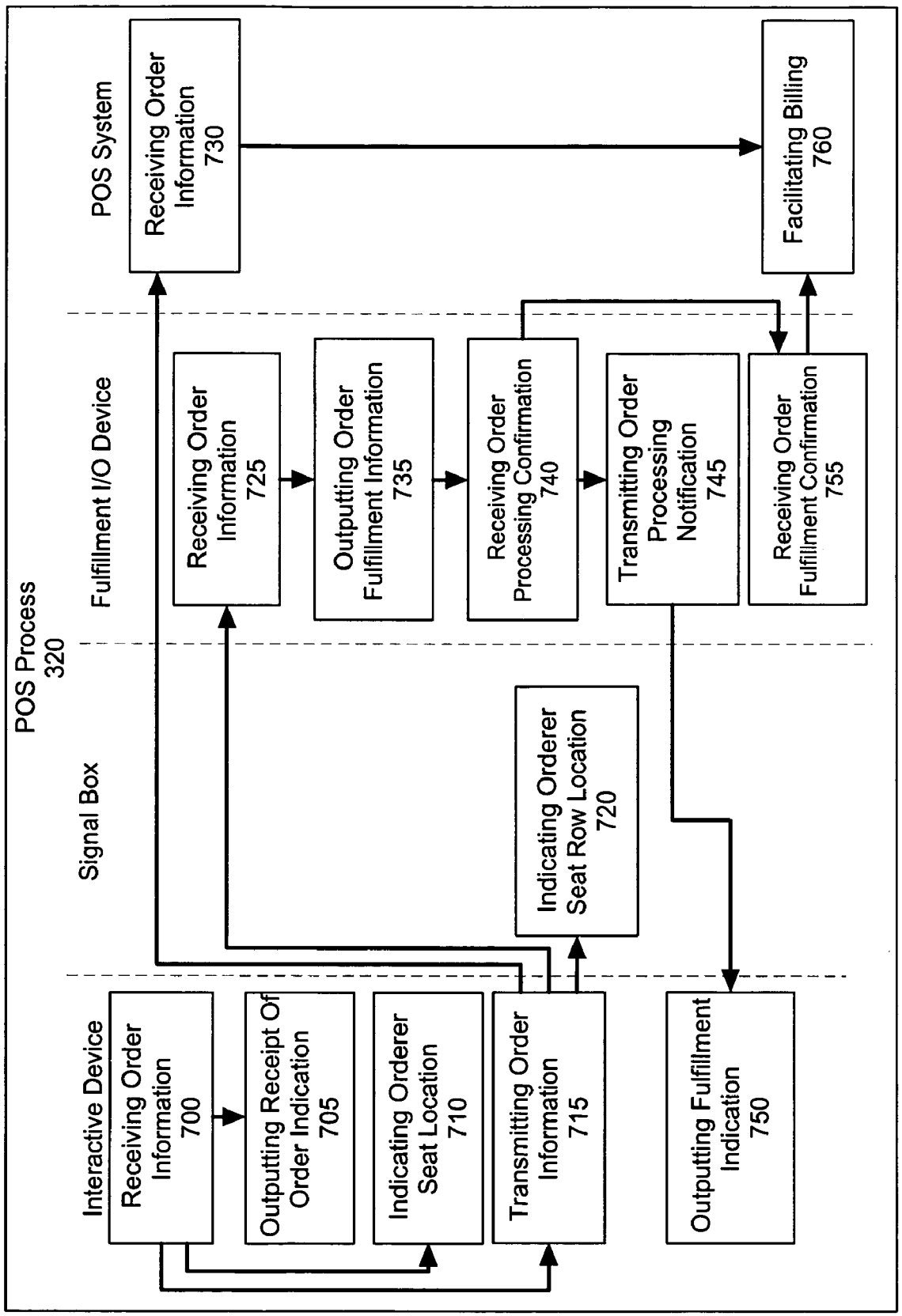
FIG. 10 depicts an embodiment of the POS process depicted in FIG. 6.

FIG. 10 depicts an embodiment of the POS process 320 depicted in FIG. 6. It is contemplated herein that the POS process 320 capable of being facilitated independent of a theme based interactive experience (e.g., during a conventional presentation of a movie). It is also contemplated that the POS process may be implemented via a system other than an IMS system in accordance with am embodiment of the disclosures made herein (i.e., standalone functionality).

In facilitating the POS process 320, an interactive device performs an operation 700 for receiving order information (e.g., receiving information associated with a theme-based POS opportunity or information associated with a concession item). Examples of order information includes a number indicated in a menu that corresponds to a desired snack and a 'YES' reply to an offer for a theme-based POS opportunity. In response to receiving the order information, the interactive device performs an operation 705 for outputting a receipt of order indication (e.g., illuminating a corresponding LED on the interaction device), an operation 710 for indicating an orderer seat location (e.g., illuminating a corresponding LED on the interaction device) and an operation 715 for transmitting the order information for reception by the venue's POS system and by a fulfillment input-output (I/O) device (e.g., a kitchen touch screen device) In response to transmitting the order information, a signal box (e.g., located at the end of the row of seats) performs an operation 720 for indicating an orderer seat isle (e.g., illuminating a corresponding LED on the signal box). It is contemplated herein that the fulfillment I/O device may be that of the venue's POS system, that of an IMP or a standalone element.

In response to the interactive device transmitting the order information, the fulfillment I/O device performs an operation 725 for receiving the order information and the POS system performs an operation 730 for receiving the order information. The fulfillment I/O device performs an operation 735 for outputting (e.g., displaying) order fulfillment information corresponding to the order information after receiving the fulfillment I/O device. Location of the orderer (e.g., a seat number), contents of the order, credit card authorization and the like are examples of order fulfillment information. After outputting the order information and after an attendant (e.g., an serving person) performs necessary steps for fulfilling the order, the fulfillment I/O device performs an operation 740 for receiving an order processing confirmation from the attendant (e.g., a touch screen response indicating the order is being delivered). In response to receiving the order processing confirmation, the fulfillment I/O device performs an operation 745 for transmitting an order processing notification, followed by the interactive device performing an operation 750 for outputting an order fulfillment indication (e.g., illuminating a corresponding LED on the interaction device) to notify the orderer that the order is in the process of being fulfilled (i.e., delivered).

After the order processing confirmation is received and in conjunction with the attendant delivering the order (e.g., before or after the order is delivered), the fulfillment I/O device performs an operation 755 for receiving an order fulfillment confirmation (e.g., a touch screen response by the attendant indicating the order has been being delivered). After the fulfillment I/O device receives the order fulfillment confirmation, the POS system performs an operation 760 for facilitating billing of the order. In one embodiment, facilitating billing includes billing the order to a credit card tendered by the orderer upon entering the venue. For example, the credit card of the orderer (e.g., a experience participant) is associated with a seat of the orderer upon purchase of a ticket with the credit card, at a remote station (e.g., of the venue's POS system or IMS) after the tickets are purchased or via the orderer's interactive device. Accordingly, multiple orders by the orderer can be billed individually by the POS system or can be aggregated by the POS system and billed as a single order.

Referring now to computer readable medium in accordance with embodiments of the disclosures made herein, methods, processes and/or operations as disclosed herein for enabling interactive experience functionality are tangibly embodied by computer readable medium having instructions thereon for carrying out such methods, processes and/or operations. In one specific example, instructions are provided for carrying out the various operations of the methods, processed and/or operations depicted in FIGS. 5 through 8 and/or associated with creating and executing experience files. The instructions may be accessible by one or more processors (i.e., data processing devices) of a console as disclosed herein (i.e., a data processing system) from a memory apparatus of the console (e.g. RAM, ROM, virtual memory, hard drive memory, etc), from an apparatus readable by a drive unit of the console (e.g., a diskette, a compact disk, a tape cartridge, etc) or both. Examples of computer readable medium include a compact disk or a hard drive, which has imaged thereon a computer program adapted for carrying out interactive experience functionality as disclosed herein.

In summary, integrated interactive multimedia platform as disclosed herein has applicability and usefulness to a wide variety of types of interactive experiences. Innovative forms of entertainment represent a first type of such interactive experience that is well matched to the functionality provided by an integrated interactive multimedia platform as disclosed herein. The flexibility of an integrated interactive multimedia platform as disclosed offers the opportunity to explore new forms of interactive group entertainment, which take advantage of theater installations. Examples of interactive experiences for entertainment include interactive, pre-movie game shows; sports trivia and "guess the next play" games during live sports broadcasts; private party/event programming entertainment (e.g., special games with themes dealing with marriage for wedding showers, children for baby showers, children's birthday parties, etc.); new forms of live entertainment; new forms of interactive movies and interactive fiction; and gambling/Bingo implementations.

Business presentations represent another well-matched type of interactive experience for an integrated interactive multimedia platform as disclosed herein. As discussed above, an integrated interactive multimedia platform as disclosed herein (i.e., a console thereof) is capable of reading, interpreting and enabling display of a wide variety of presentation files (e.g., Microsoft® PowerPoint® files). Combining this capability with rich media and interactivity yields applications in large group teleconferencing, meeting facilitation, and event management.

An integrated interactive multimedia platform as disclosed herein is useful in educational applications such as distance learning, education collaboration and real-time testing. Educational classes that are hosted in movie theaters (e.g., certification programs, defensive driving programs, etc) are specific examples of educational applications for which an integrated interactive multimedia platform as disclosed herein is useful. From a physical installation standpoint within a particular environment, an integrated interactive multimedia platform as disclosed herein has possible uses in educational environments such as schools and museums.

Another application in which an integrated interactive multimedia platform as disclosed is useful is research via gathering, storing, using and reporting audience (i.e., interactive experience participant) feedback in real time. Most basically, the platform can be used to perform traditional polls of audiences. However, a more complex implementation of market research includes displaying information that a researcher wants to evaluate and facilitating a query-response evaluation (e.g., via standard and/or add-on interactive devices) as the audience watches the displayed information. In this manner, timing of responses during the interactive experience can be recorded, allowing the researcher to review and evaluate aggregate or individual audience responses in real-time (i.e., a context-specific manner).

Implementation of an interactive device that includes an expansion port enables research that includes physiological information (e.g., pulse rate, skin temperature, skin galvanic response, etc). The expansion port enables a suitable device to be utilized for gathering such physiological information. Physiological Response Measurement (PRM) technology is an example of a technology capable of gathering physiological information. It is contemplated herein that a suitable configured finger cuff is plugged into the expansion port of interactive devices such that the console of the IIMP can record changes in specific experience participants or all participants in a particular experience. By recording and reporting this physiological information, market researchers can gather real-time, direct physiological evidence of an audience's emotional response.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, methodology and electrical changes may be made without departing from the spirit or scope of the invention. For example, operational and/or functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method configured for facilitating an interactive multimedia experiences, comprising:
   at least one data processing device accessing, from memory coupled to said at least one data processing device, instructions causing said at least one data processing device to access a system-readable specification defining a multimedia experience configured for audience interaction; and
   said at least one data processing device accessing, from said memory, instructions causing said at least one data processing device to perform the multimedia experience in accordance with information comprised by the system-readable specification, wherein said information comprised by the system-readable specification includes information for enabling facilitation of audience response tracking, experience navigation and feedback of audience responses, wherein said information of the system-readable specification includes a plurality of experience segments that jointly define the multimedia experience, wherein each one of said display elements specifies at least one display element thereof, wherein said at least one display element has a multimedia asset associated therewith, and wherein each one of said experience segments is configured in accordance with a specification format associating a multimedia asset with each display element thereof via a respective display element attribute.

2. The method of claim 1 wherein causing said at least one data processing device to perform the multimedia experience includes causing said at least one data processing device to gather audience responses.

3. The method of claim 2 wherein causing said at least one data processing device to perform the multimedia experience includes causing said at least one data processing device to:
   analyze said audience responses; and
   output information resulting from said analysis.

4. The method of claim 3 wherein causing said at least one data processing device to output said information resulting from analyzing said audience responses includes causing said at least one data processing device to display at least a portion of said information resulting from analyzing said audience responses.

5. The method of claim 4 wherein causing said at least one data processing device to perform the multimedia experience includes causing said at least one data processing device to output experience content.

6. The method of claim 1 wherein causing said at least one data processing device to perform the multimedia experience includes causing said at least one data processing device to:
   gather audience responses;
   analyze said audience responses;
   output information resulting from said analysis; and
   output experience content dependent upon at least a portion of said information resulting from analyzing said audience responses.

7. The method of claim 6 wherein causing said at least one data processing device to output said information resulting from analyzing said audience responses includes causing said at least one data processing device to display at least a portion of said information resulting from analyzing said audience responses.

8. The method of claim 1 wherein:
   a first one of said experience segments of the system-readable specification comprises a plurality of display elements;
   each one of said display elements is configured in accordance with a specification format associating a multimedia file with each one of said display element thereof via a respective display element attribute; and
   a file format of a multimedia file associated with a first one of said display elements is different than a file format of a multimedia file associated with second one of said display elements.

9. A system configured for facilitating an interactive multimedia experience, comprising, comprising:
   at least one data processing device;
   instructions processable by said at least one data processing device; and
   an apparatus from which said instructions are accessible by said at least one data processing device;
   wherein said instructions are configured for enabling said at least one data processing device to facilitate:
   accessing a system-readable specification defining a multimedia experience configured for audience interaction; and
   performing the multimedia experience in accordance with information comprised by the system-readable specification, wherein said information comprised by the system-readable specification includes information for enabling facilitation of audience response tracking, experience navigation and feedback of audience responses, wherein said information of the system-readable specification includes a plurality of experience segments that jointly define the multimedia experience, wherein each one of said display elements specifies at least one display element thereof, wherein said at least one display element has a multimedia asset associated therewith, and wherein each one of said experience segments is configured in accordance with a specification format associating a multimedia asset with each display element thereof via a respective display element attribute.

10. The system of claim 9 wherein performing the multimedia experience includes gathering audience responses.

11. The system of claim 10 wherein performing the multimedia experience includes:
analyzing said audience responses; and
outputting information resulting from said analysis.

12. The system of claim 11 wherein outputting said information resulting from analyzing said audience responses includes displaying at least a portion of said information resulting from analyzing said audience responses.

13. The system of claim 12 wherein performing the multimedia experience includes outputting experience content.

14. The system of claim 9 wherein performing the multimedia experience includes:
gathering audience responses;
analyzing said audience responses;
outputting information resulting from said analysis; and
outputting experience content dependent upon at least a portion of said information resulting from analyzing said audience responses.

15. The system of claim 14 wherein outputting said information resulting from analyzing said audience responses includes displaying at least a portion of said information resulting from analyzing said audience responses.

16. The system of claim 9 wherein:
a first one of said experience segments of the system-readable specification comprises a plurality of display elements;
each one of said display elements is configured in accordance with a specification format associating a multimedia file with each one of said display element thereof via a respective display element attribute; and
a file format of a multimedia file associated with a first one of said display elements is different than a file format of a multimedia file associated with second one of said display elements.

17. A system configured for facilitating an interactive multimedia experience, comprising, comprising:
means for accessing a system-readable specification defining a multimedia experience configured for audience interaction; and
means for performing the multimedia experience in accordance with information comprised by the system-readable specification, wherein said information comprised by the system-readable specification includes information for enabling facilitation of audience response tracking, experience navigation and feedback of audience responses, wherein said information of the system-readable specification includes a plurality of experience segments that jointly define the multimedia experience, wherein each one of said display elements specifies at least one display element thereof, wherein said at least one display element has a multimedia asset associated therewith, and wherein each one of said experience segments is configured in accordance with a specification format associating a multimedia asset with each display element thereof via a respective display element attribute.

18. A method configured for facilitating an interactive multimedia experience, comprising:
at least one data processing device accessing, from memory coupled to said at least one data processing device, instructions causing said at least one data processing device to access a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
said at least one data processing device accessing, from said memory, instructions causing said at least one data processing device to maintain updates of experience feedback information; and
said at least one data processing device accessing, from said memory, instructions causing said at least one data processing device to perform said multimedia experience dependent upon information comprised by the system-readable specification and said experience feedback information.

19. The method of claim 18 wherein said feedback information includes experience state information and audience response information and wherein said feedback information is derived exclusively from at least one query defined within the system-readable specification.

20. The method of claim 18 wherein causing said at least one data processing device to:
performing the multimedia experience includes causing said at least one data processing device to access a multimedia asset associated with one of said display elements; and
access information for the multimedia asset is specified within the system-readable specification.

21. The method of claim 18 wherein said feedback information includes information resulting from analysis of a sound file of the one of said display elements.

22. The method of claim 21 wherein said analysis of the sound file includes analysis of at least one of amplitude characteristics of the sound file and length characteristics of the sound file.

23. The method of claim 22 wherein said causing said at least one data processing device to perform includes causing said at least one data processing device to synchronize a video component comprised by the multimedia experience with a corresponding audio component comprised by the multimedia experience dependent upon said information resulting from analysis of the sound file.

24. The method of claim 18 wherein causing said at least one data processing device to perform the multimedia experience includes causing said at least one data processing device to gather audience responses and wherein said gathering is performed exclusively in accordance with at least one query defined within the system-readable specification.

25. The method of claim 24 wherein causing said at least one data processing device to perform the multimedia experience includes:
causing said at least one data processing device to analyze said audience responses; and
causing said at least one data processing device to output information resulting from said analyzing.

26. The method of claim 25 wherein causing said at least one data processing device to output said information resulting from analyzing said audience responses includes causing said at least one data processing device to display at least a portion of said information resulting from analyzing said audience responses.

27. The method of claim 25 wherein said information comprised by said system-readable specification includes information for enabling facilitation of audience response tracking, experience navigation and feedback of audience responses.

28. The method of claim 25 wherein causing said at least one data processing device to perform the multimedia experience includes causing said at least one data processing device to output experience content.

29. The method of claim 28 wherein said information comprised by the system-readable specification includes information for enabling facilitation of audience response tracking, experience navigation and feedback of audience responses.

30. The method of claim 18 wherein causing said at least one data processing device to performing the multimedia experience includes causing said at least one data processing device to:
gather audience responses;
analyze said audience responses;
output information resulting from said analyzing; and
output experience content dependent upon at least a portion of said information resulting from analyzing said audience responses;
wherein said gathering is performed exclusively in accordance with at least one query defined within the system-readable specification.

31. The method of claim 30 wherein causing said at least one data processing device to output said information resulting from analyzing said audience responses includes causing said at least one data processing device to display at least a portion of said information resulting from analyzing said audience responses.

32. The method of claim 18 wherein:
each one of said display elements comprises a respective portion of the multimedia experience; and
causing said at least one data processing device to perform the multimedia experience includes causing said at least one data processing device to perform at least a portion of said display elements.

33. The method of claim 32 wherein said information comprised by the system-readable specification includes information for enabling facilitation of audience response tracking, experience navigation and feedback of audience responses.

34. A system configured for facilitating an interactive multimedia experience, comprising:
at least one data processing device;
instructions processable by said at least one data processing device; and
an apparatus from which said instructions are accessible by said at least one data processing device;
wherein said instructions are configured for enabling said at least one data processing device to facilitate:
accessing a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
maintaining updates of experience feedback information; and
performing said multimedia experience dependent upon information comprised by the system-readable specification and said experience feedback information.

35. The system of claim 34 wherein said feedback information includes experience state information and audience response information and wherein said feedback information is derived exclusively from at least one query defined within the system-readable specification.

36. The system of claim 34 wherein:
performing the multimedia experience includes accessing a multimedia asset associated with one of said display elements; and
access information for the multimedia asset is specified within the system-readable specification.

37. The system of claim 34 wherein said feedback information includes information resulting from analysis of a sound file of the one of said display elements.

38. The system of claim 37 wherein said analysis of the sound file includes analysis of at least one of amplitude characteristics of the sound file and length characteristics of the sound file.

39. The system of claim 38 wherein said performing includes synchronizing a video component comprised by the multimedia experience with a corresponding audio component comprised by said multimedia experience dependent upon said information resulting from analysis of the sound file.

40. The system of claim 34 wherein performing the multimedia experience includes gathering audience responses and wherein said gathering is performed exclusively in accordance with at least one query defined within the system-readable specification.

41. The system of claim 40 wherein performing the multimedia experience includes:
analyzing said audience responses; and
outputting information resulting from said analyzing.

42. The system of claim 41 wherein outputting said information resulting from analyzing said audience responses includes displaying at least a portion of said information resulting from analyzing said audience responses.

43. The system of claim 41 wherein said information comprised by said system-readable specification includes information for enabling facilitation of audience response tracking, experience navigation and feedback of audience responses.

44. The system of claim 41 wherein performing the multimedia experience includes outputting experience content.

45. The system of claim 34 wherein said information comprised by the system-readable specification includes information for enabling facilitation of audience response tracking, experience navigation and feedback of audience responses.

46. The system of claim 34 wherein performing the multimedia experience includes:
gathering audience responses;
analyzing said audience responses;
outputting information resulting from said analyzing; and
outputting experience content dependent upon at least a portion of said information resulting from analyzing said audience responses;
wherein said gathering is performed exclusively in accordance with at least one query defined within the system-readable specification.

47. The system of claim 46 wherein outputting said information resulting from analyzing said audience responses includes displaying at least a portion of said information resulting from analyzing said audience responses.

48. The system of claim 34 wherein:
each one of said display elements comprises a respective portion of the multimedia experience; and
performing the multimedia experience includes performing at least a portion of said display elements.

49. The system of claim 48 wherein said information comprised by the system-readable specification includes information for enabling facilitation of audience response tracking, experience navigation and feedback of audience responses.

50. A system configured for facilitating an interactive multimedia experience, comprising:
means for accessing a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
means for maintaining updates of experience feedback information, wherein said experience feedback information is derived from a query specified by one of said display elements; and
means for performing said multimedia experience dependent upon information comprised by the system-readable specification and said experience feedback information.

51. A method configured for facilitating an interactive multimedia experiences, comprising:
at least one data processing device accessing, from memory coupled to said at least one data processing device, instructions causing said at least one data processing device to create a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
said at least one data processing device accessing, from said memory, instructions causing said at least one data processing device to designate a feedback information action for enabling corresponding experience feedback information to be updated accordingly in response to performing the multimedia experience; and
said at least one data processing device accessing, from said memory, instructions causing said at least one data processing device to associate the feedback information action with the system-readable specification, whereby performing the multimedia experience is dependent upon said corresponding experience feedback information.

52. The method of claim 51 wherein causing said at least one data processing device to create the system-readable specification includes specifying access information for at least one multimedia asset comprised by the multimedia experience.

53. The method of claim 51 wherein causing said at least one data processing device to create the system-readable specification is performed dependent upon system-specified rules configured for enabling the specification to be interpreted and performed by said system.

54. The method of claim 51 wherein said experience feedback information includes experience state information and audience response information.

55. The method of claim 51 wherein:
causing said at least one data processing device to perform the multimedia experience includes accessing a multimedia asset associated with one of said display elements; and
access information for the multimedia asset is specified within the system-readable specification.

56. The method of claim 51 wherein causing said at least one data processing device to create in the system-readable specification includes causing said at least one data processing device to specify a manner in which audience responses are gathered.

57. The method of claim 56 wherein causing said at least one data processing device to create the system-readable specification includes causing said at least one data processing device to specify a manner in which:
said audience responses are analyzed; and
information resulting from said analyzing is outputted.

58. The method of claim 57 wherein causing said at least one data processing device to specify the manner in which said information resulting from analyzing said audience responses is outputted includes causing said at least one data processing device to specify a manner in which at least a portion of said information resulting from analyzing said audience responses is displayed.

59. The method of claim 58 wherein causing said at least one data processing device to create the system-readable specification includes causing said at least one data processing device to specify a manner in which experience content is outputted.

60. The method of claim 51 wherein causing said at least one data processing device to create the system-readable specification includes causing said at least one data processing device to specify a manner in which audience response tracking, experience navigation and feedback of audience responses are performed.

61. The method of claim 51 wherein causing said at least one data processing device to create the system-readable specification includes causing said at least one data processing device to specify a manner in which:
audience responses are gathered;
said audience responses are analyzed;
information resulting from said analyzing is outputted;
experience content is outputted; and
at least one of audience response tracking, experience navigation and feedback of audience responses is performed.

62. A system configured for facilitating an interactive multimedia experiences, comprising:
at least one data processing device;
instructions processable by said at least one data processing device; and
an apparatus from which said instructions are accessible by said at least one data processing device;
wherein said instructions are configured for enabling said at least one data processing device to facilitate:
creating a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
designating a feedback information action for enabling corresponding experience feedback information to be updated accordingly in response to performing the multimedia experience; and associating the feedback information action with the system-readable specification, whereby performing the multimedia experience is dependent upon said corresponding experience feedback information.

63. The system of claim 62 wherein creating the system-readable specification includes specifying access information for at least one multimedia asset comprised by the multimedia experience.

64. The system of claim 62 wherein creating the system-readable specification is performed dependent upon system-specified rules configured for enabling the specification to be interpreted and performed by said system.

65. The system of claim 62 wherein said experience feedback information includes at least one of experience state information and audience response information.

66. The system of claim 62 wherein:
performing the multimedia experience includes accessing a multimedia asset associated with one of said display elements; and
access information for the multimedia asset is specified within the system-readable specification.

67. The system of claim 62 wherein creating the system-readable specification includes specifying a manner in which audience responses are gathered.

68. The system of claim 67 wherein creating the system-readable specification includes specifying a manner in which:
said audience responses are analyzed; and
information resulting from said analyzing is outputted.

69. The system of claim 68 wherein specifying the manner in which said information resulting from analyzing said audience responses is outputted includes specifying a manner in which at least a portion of said information resulting from analyzing said audience responses is displayed.

70. The system of claim 69 wherein creating the system-readable specification includes specifying a manner in which experience content is outputted.

71. The system of claim 62 wherein creating the system-readable specification includes specifying a manner in which audience response tracking, experience navigation and feedback of audience responses are performed.

72. The system of claim 62 wherein creating the system-readable specification includes specifying a manner in which:
audience responses are gathered;
said audience responses are analyzed;
information resulting from said analyzing is outputted;
experience content is outputted; and
at least one of audience response tracking, experience navigation and feedback of audience responses is performed.

73. A system configured for facilitating an interactive multimedia experiences, comprising:
means for creating a system-readable specification defining a multimedia experience configured for audience interaction, wherein the system-readable specification includes an experience segment having a plurality of display elements and wherein the experience segment is configured in accordance with a specification format associating a multimedia asset with each display element thereof via a respective display element attribute;
means for designating a feedback information action for enabling corresponding experience feedback information to be updated accordingly in response to performing the multimedia experience; and
means for associating the feedback information action with the system-readable specification, whereby performing the multimedia experience is dependent upon said corresponding experience feedback information.

74. A method configured for creating a system-readable specification defining a multimedia experience configured for audience interaction, comprising;
at least one data processing device accessing, from memory coupled to said at least one data processing device, instructions causing said at least one data processing device to specify a manner in which audience response tracking is performed;
said at least one data processing device accessing, from said memory, instructions causing said at least one data processing device to specify a manner in which experience navigation is performed; and
said at least one data processing device accessing, from said memory, instructions causing said at least one data processing device to specify a manner in which feedback of audience responses is performed;
wherein causing said at least one data processing device to specify the manner in which said response tracking, said experience navigation and said feedback of audience response is performed includes causing said at least one data processing device to create a plurality of experience segments each having at least one display element;
and wherein each one of said experience segments is configured in accordance with a specification format associating a multimedia asset with each display element thereof via a respective display element attribute.

75. The method of claim 74, further comprising:
said at least one data processing device accessing, from said memory, instructions causing said at least one data processing device to specify a manner in which said audience responses are analyzed; and
said at least one data processing device accessing, from said memory, instructions causing said at least one data processing device to specify a manner in which information resulting from said analyzing is outputted.

76. The method of claim 75 wherein causing said at least one data processing device to specify the manner in which said information resulting from analyzing said audience responses is outputted includes causing said at least one data processing device to specify a manner in which at least a portion of said information resulting from analyzing said audience responses is displayed.

77. The method of claim 74, further comprising:
said at least one data processing device accessing, from said memory, instructions causing said at least one data processing device to specify access information for at least one multimedia asset comprised by the multimedia experience.

78. A system configured for creating a system-readable specification defining a multimedia experience configured for audience interaction, comprising;
at least one data processing device;
instructions processable by said at least one data processing device; and
an apparatus from which said instructions are accessible by said at least one data processing device;
wherein said instructions are configured for enabling said at least one data processing device to facilitate:
specifying a manner in which audience response tracking is performed;
specifying a manner in which experience navigation is performed; and
specifying a manner in which feedback of audience responses is perform; and wherein specifying the manner in which said response tracking, said experience navigation and said feedback of audience response is performed includes creating a plurality of experience segments each having at least one display element and wherein each one of said experience segments is configured in accordance with a specification format associating a multimedia asset with each display element thereof via a respective display element attribute.

79. The system of claim 78 wherein each one of said specifying are performed dependent upon system-specified rules configured for enabling a system-readable specification to be interpreted and performed by said system.

80. The system of claim 78 further comprising:
means for specifying a manner in which said audience responses are analyzed; and
means for specifying a manner in which information resulting from said analyzing is outputted.

81. The system of claim 80 wherein specifying the manner in which said information resulting from analyzing said audience responses is outputted includes specifying a manner in which at least a portion of said information resulting from analyzing said audience responses is displayed.

82. The system of claim 78, further comprising:
specifying access information for at least one multimedia asset comprised by the multimedia experience.

83. A system configured for creating a system-readable specification defining a multimedia experience configured for audience interaction, comprising;
means for specifying a manner in which audience response tracking is performed;
means for specifying a manner in which experience navigation is performed; and
means for specifying a manner in which feedback of audience responses is performed;
wherein specifying the manner in which said response tracking, said experience navigation and said feedback of audience response is performed includes creating a plurality of experience segments each having at least one display element and wherein each one of said experience segments is configured in accordance with a specification format associating a multimedia asset with each display element thereof via a respective display element attribute.

* * * * *